US012128558B2

(12) United States Patent
Hosek

(10) Patent No.: US 12,128,558 B2
(45) Date of Patent: Oct. 29, 2024

(54) COMPACT TRAVERSING ROBOT

(71) Applicant: Persimmon Technologies Corporation, Wakefield, MA (US)

(72) Inventor: Martin Hosek, Lowell, MA (US)

(73) Assignee: Persimmon Technologies Corporation, Wakefield, MA (US)

( * ) Notice: Subject to any disclaimer, the term of this patent is extended or adjusted under 35 U.S.C. 154(b) by 417 days.

(21) Appl. No.: 17/189,381

(22) Filed: Mar. 2, 2021

(65) Prior Publication Data
US 2021/0268641 A1  Sep. 2, 2021

Related U.S. Application Data

(60) Provisional application No. 62/983,846, filed on Mar. 2, 2020.

(51) Int. Cl.
*B25J 9/04* (2006.01)
*B25J 5/02* (2006.01)
*B25J 9/10* (2006.01)
*B25J 9/12* (2006.01)
*B25J 11/00* (2006.01)

(52) U.S. Cl.
CPC ............. *B25J 9/044* (2013.01); *B25J 5/02* (2013.01); *B25J 9/1005* (2013.01); *B25J 9/123* (2013.01); *B25J 9/126* (2013.01); *B25J 11/0095* (2013.01)

(58) Field of Classification Search
CPC ... B25J 5/02; B25J 9/044; B25J 9/1005; B25J 9/123; B25J 9/126; B25J 11/0095
See application file for complete search history.

(56) References Cited

U.S. PATENT DOCUMENTS

| | | | |
|---|---|---|---|
| 4,678,952 A | * | 7/1987 | Peterson .............. B25J 19/0029 901/29 |
| 9,149,936 B2 | | 10/2015 | Hosek et al. |
| 9,840,004 B2 | | 12/2017 | Hosek et al. |
| 9,889,557 B2 | | 2/2018 | Hosek et al. |
| 10,224,232 B2 | | 3/2019 | Hosek |
| 10,569,430 B2 | | 2/2020 | Hosek et al. |
| 10,882,194 B2 | | 1/2021 | Hosek et al. |
| 2014/0140801 A1 | * | 5/2014 | Sueyoshi ................ B25J 9/042 414/800 |
| 2019/0240831 A1 | * | 8/2019 | Bonora ............... B25J 11/0095 |

(Continued)

FOREIGN PATENT DOCUMENTS

KR   10-2012-0067488    *  6/2012

*Primary Examiner* — William C Joyce
(74) *Attorney, Agent, or Firm* — Harrington & Smith

(57) ABSTRACT

An apparatus includes a spindle platform; a traversing platform configured to move in a first direction; a lift system connected to the spindle platform and the traversing platform, the lift system configured to move the spindle platform in a second direction perpendicular to the first direction; a movable arm connected to the spindle platform, the movable arm including a first link connected to the spindle platform, a second link connected to the first link, and a third link connected to the second link, and a first actuator connected to the spindle platform and configured to cause a rotation of the first link, and a second actuator in the movable arm and configured to cause a rotation of the second link. The first actuator extends from the spindle platform into the first link to occupy a combined thickness of the spindle platform and the first link.

27 Claims, 23 Drawing Sheets

(56) References Cited

U.S. PATENT DOCUMENTS

| | | | |
|---|---|---|---|
| 2019/0283244 A1* | 9/2019 | Bonora | ............... B25J 13/06 |
| 2020/0262060 A1 | 8/2020 | Hosek et al. | |
| 2020/0262660 A1 | 8/2020 | Hosek et al. | |

* cited by examiner

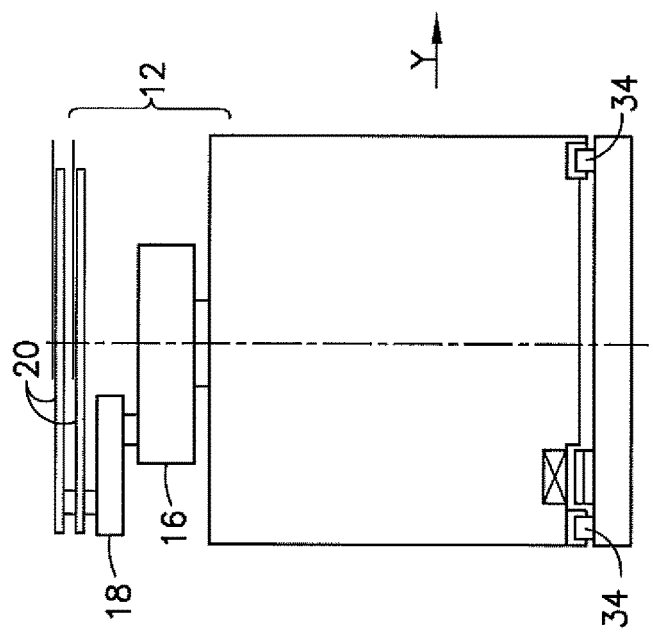
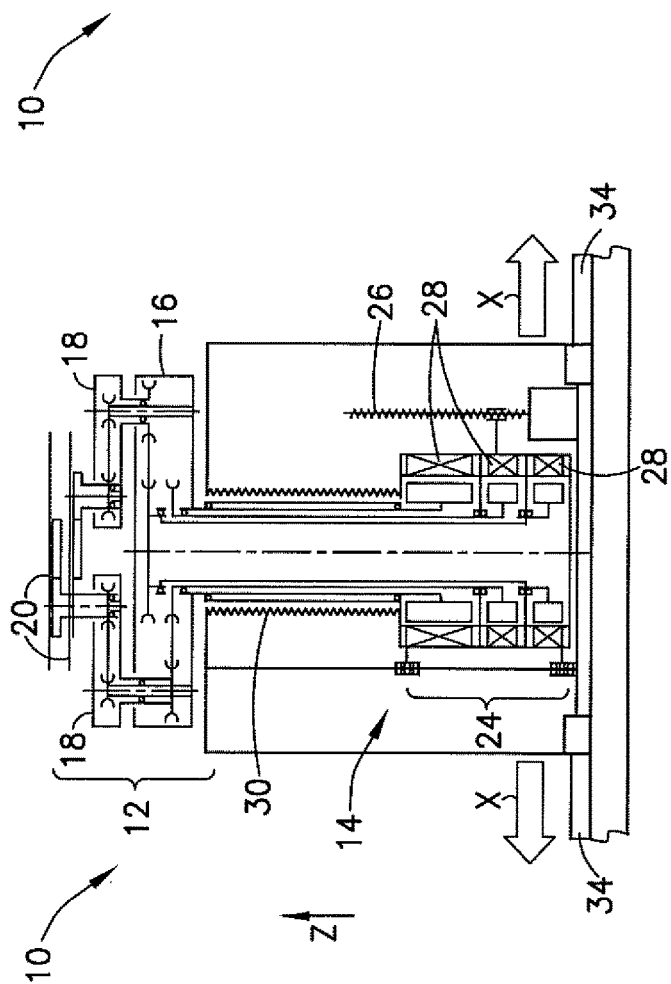
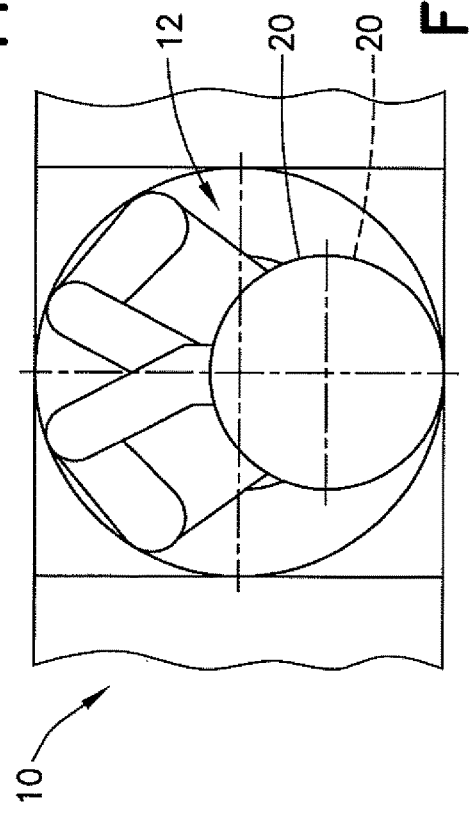
FIG. 0A
FIG. 0B
FIG. 0C

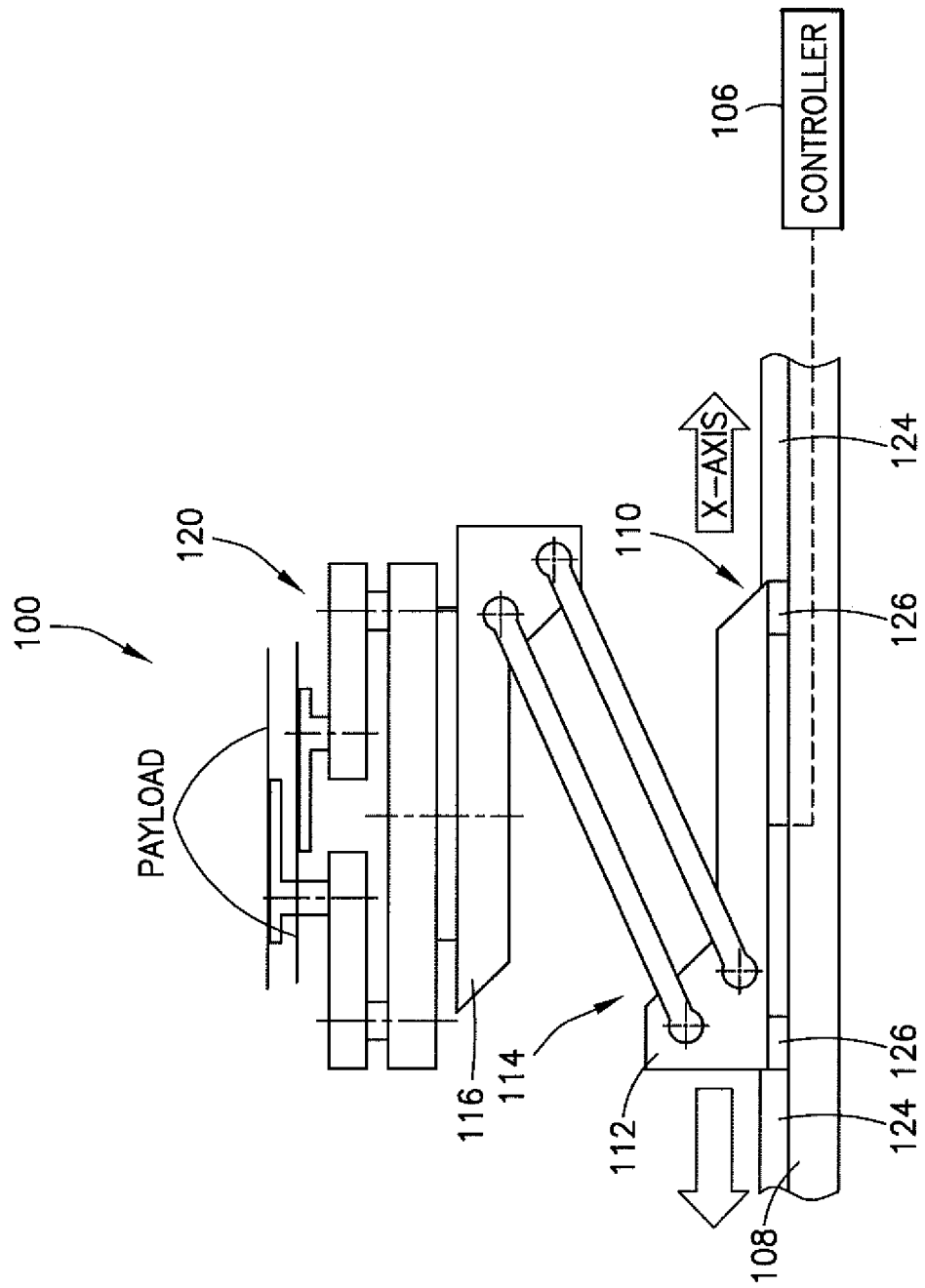

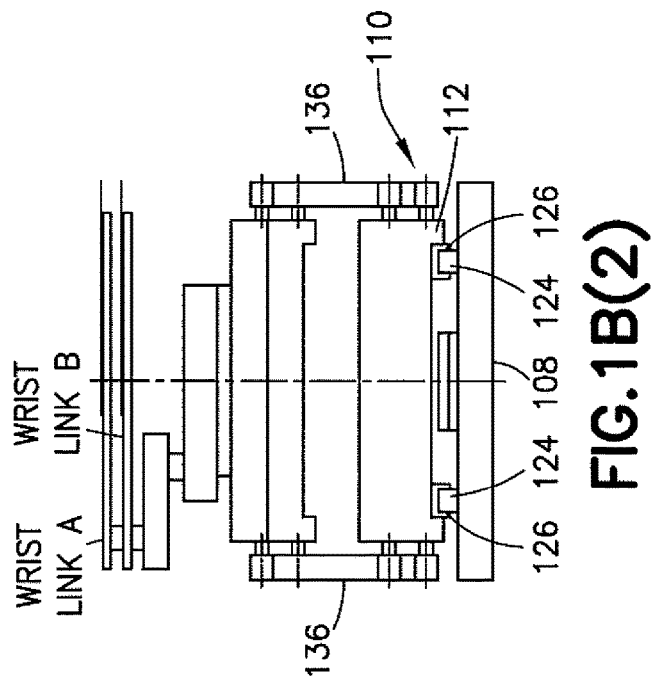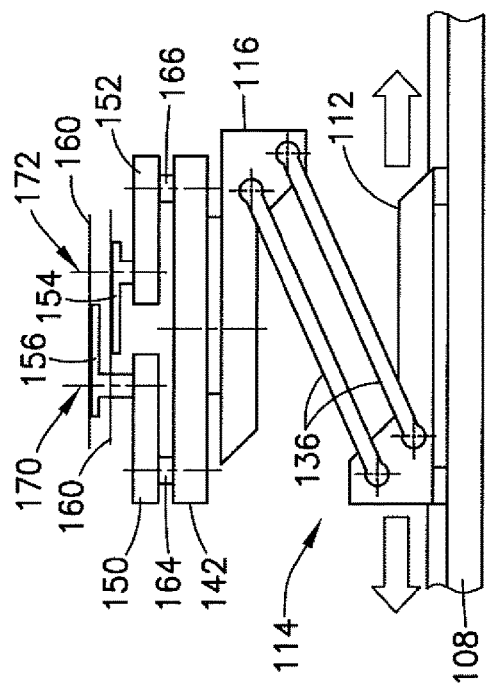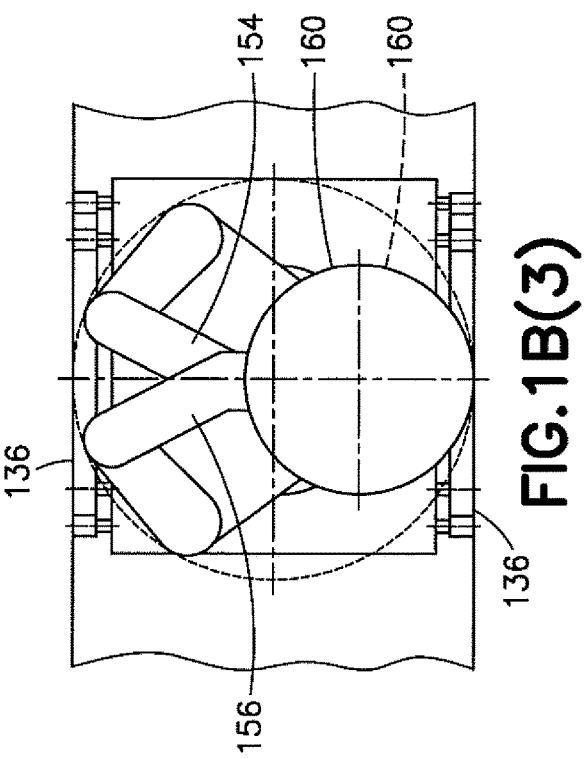

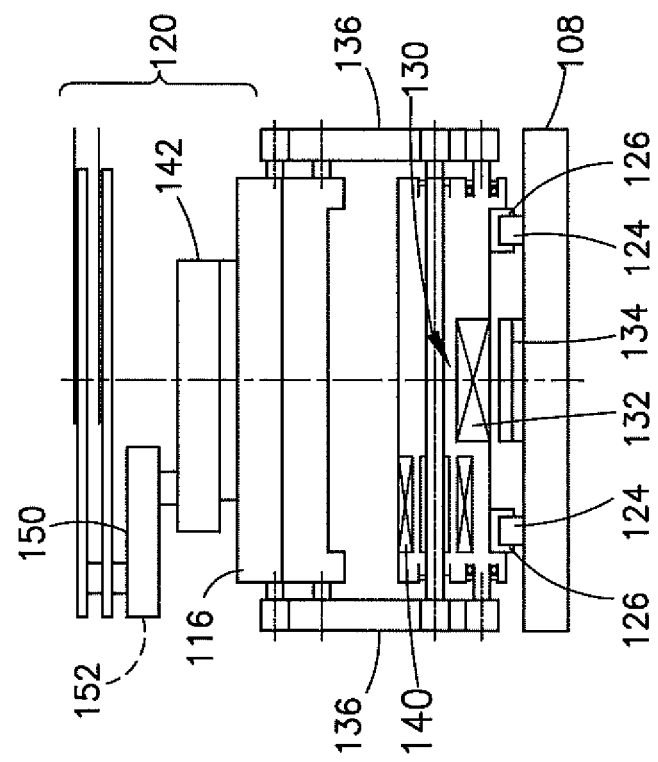
FIG.1C(2)
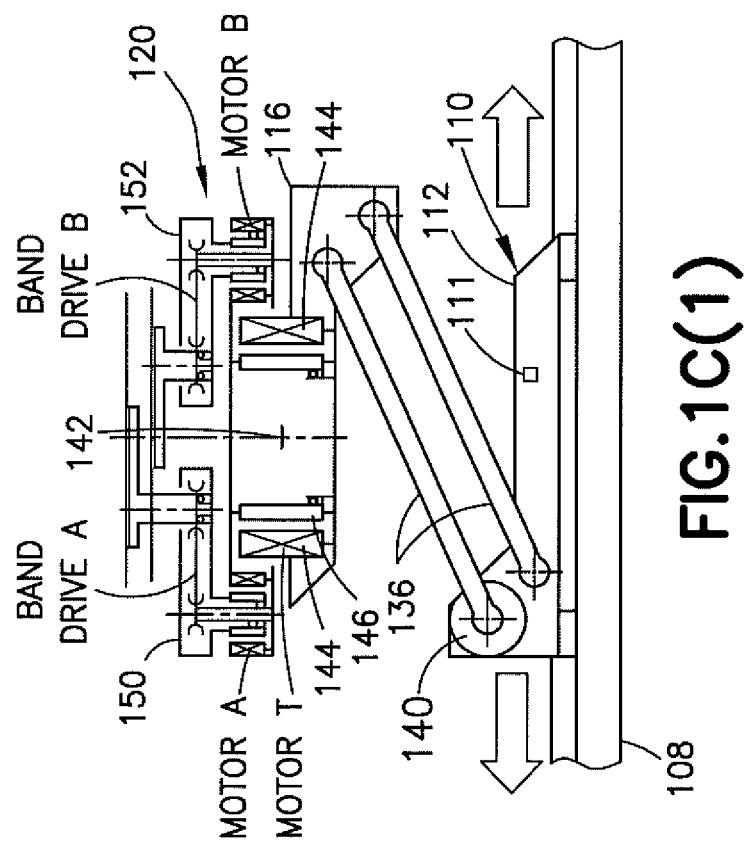
FIG.1C(1)

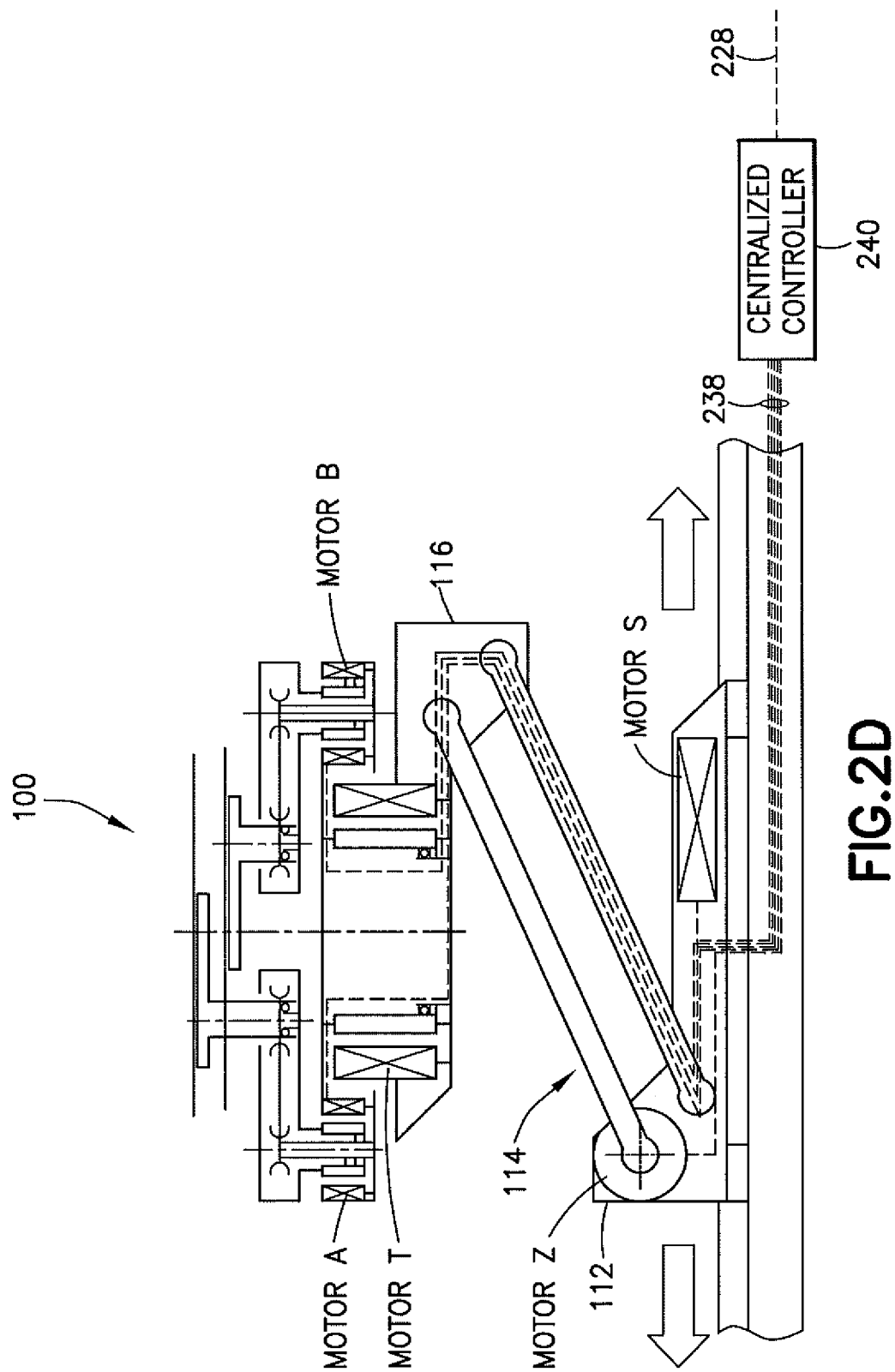

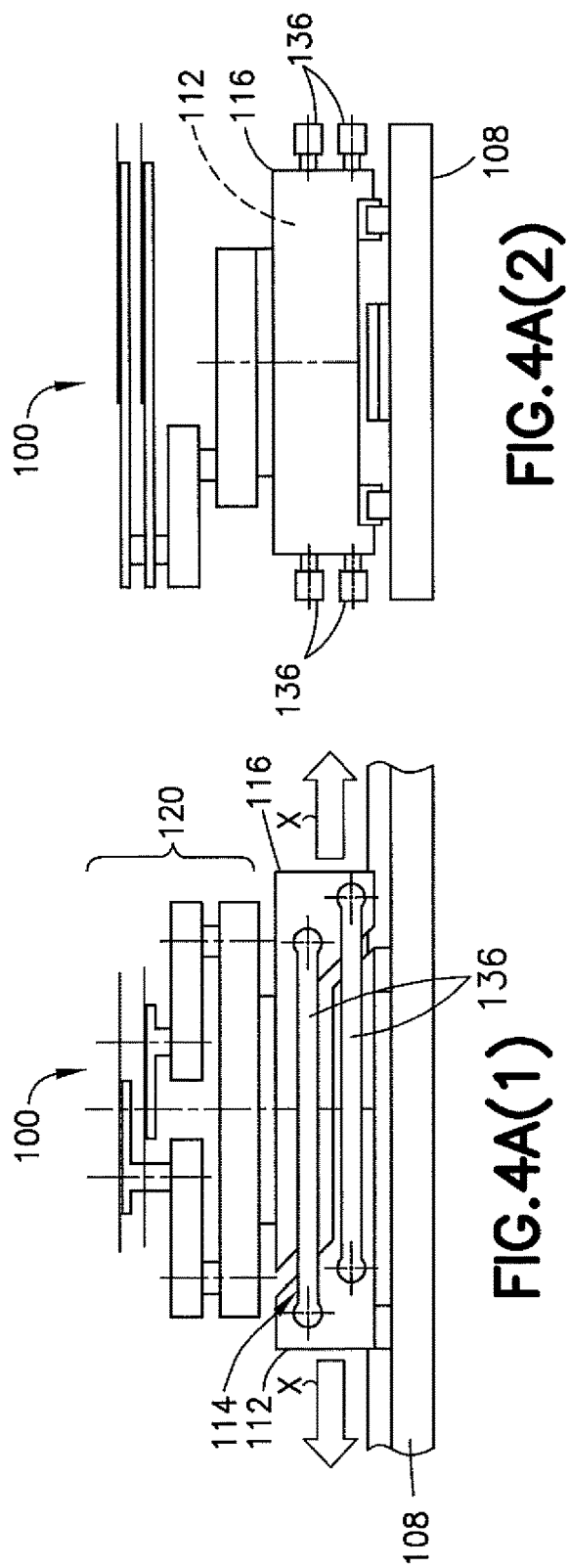
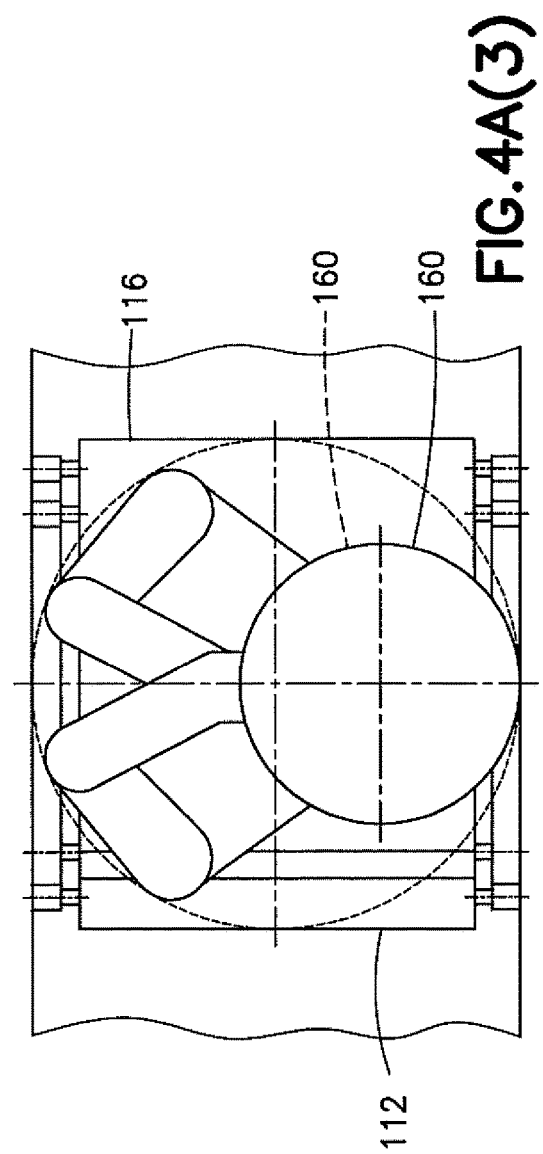

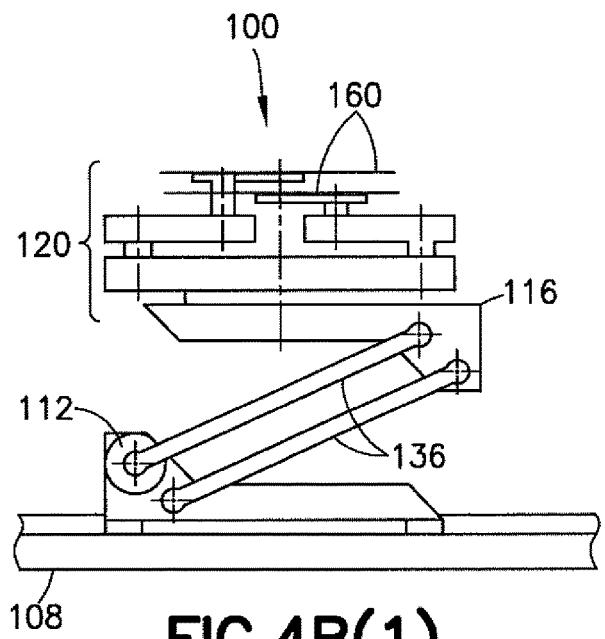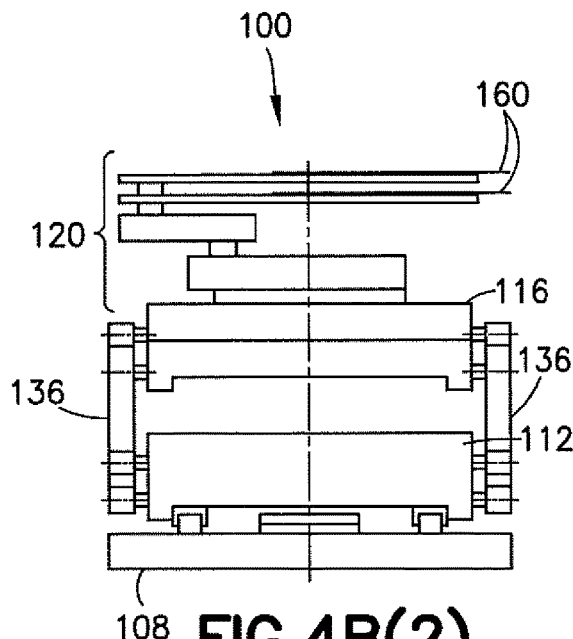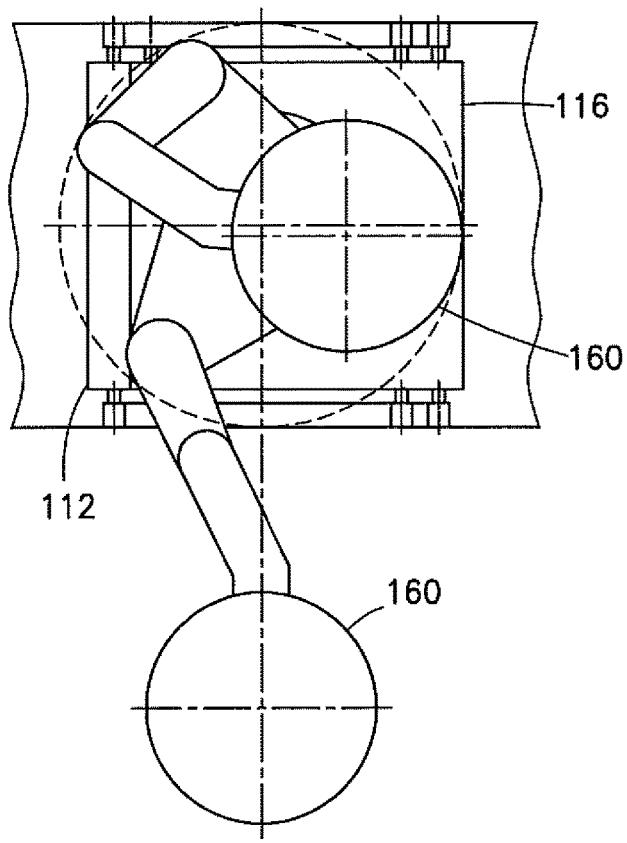

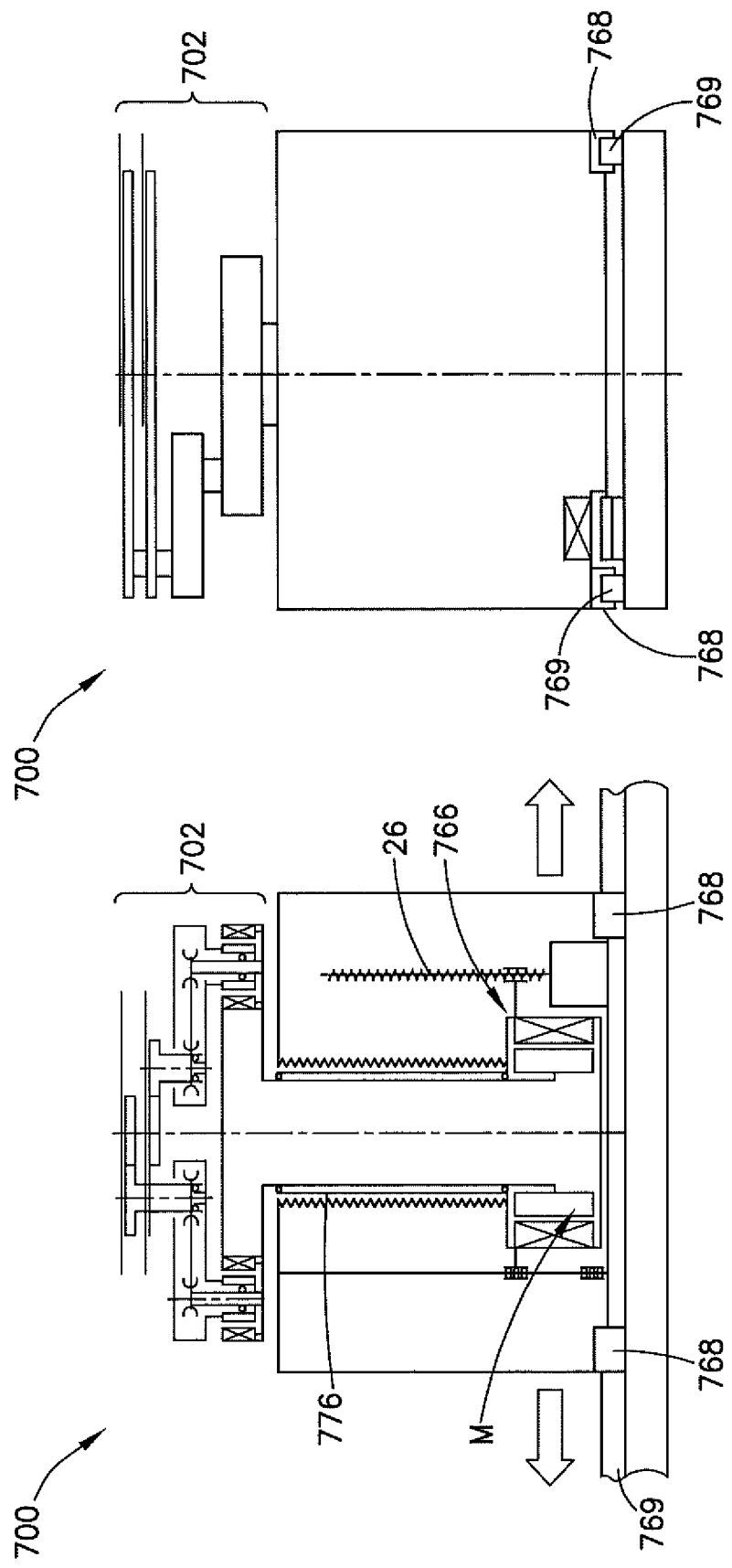

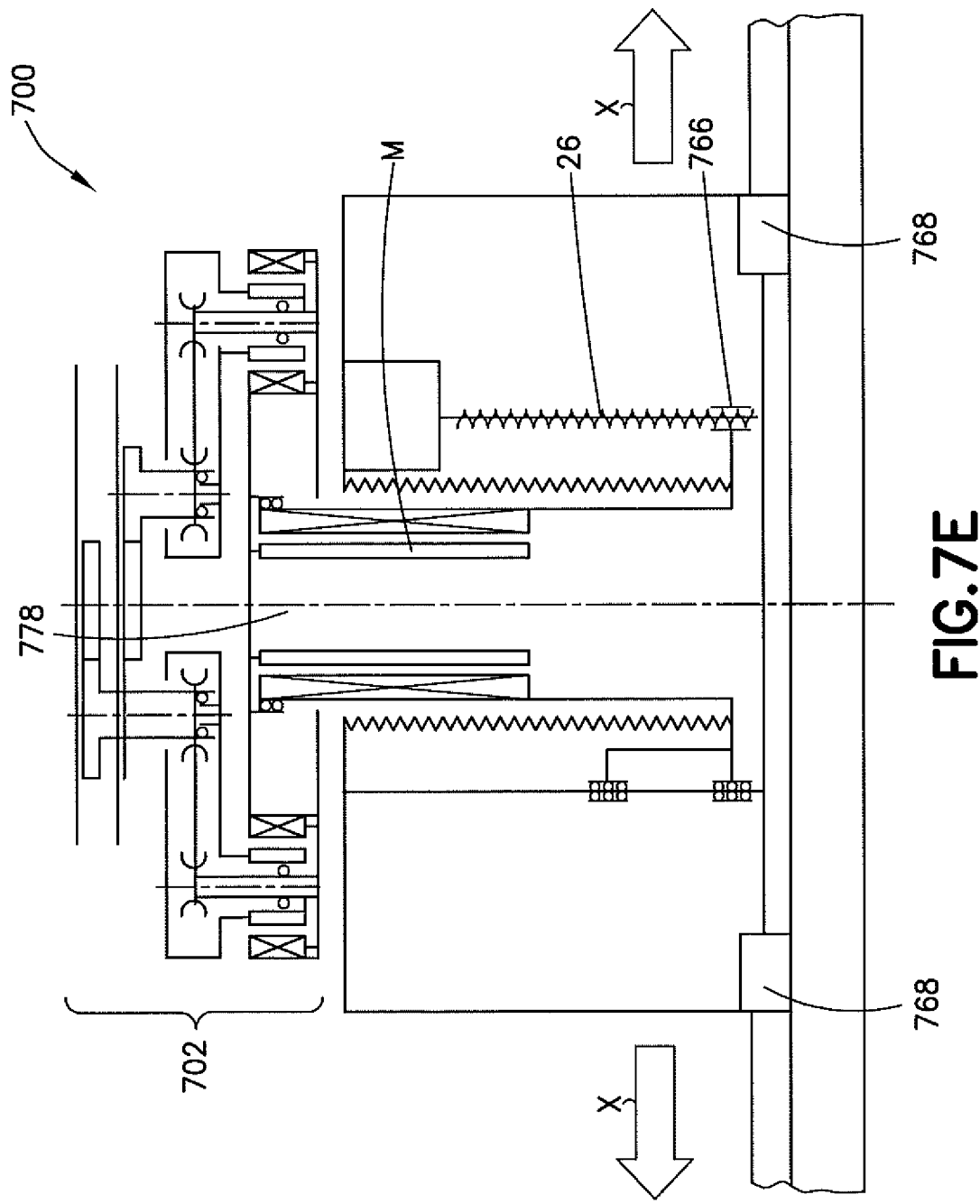

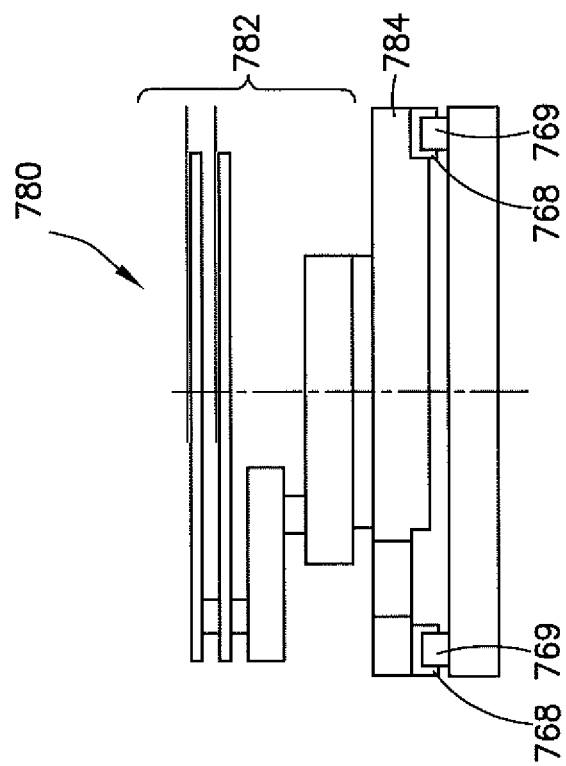
FIG.7F(2)
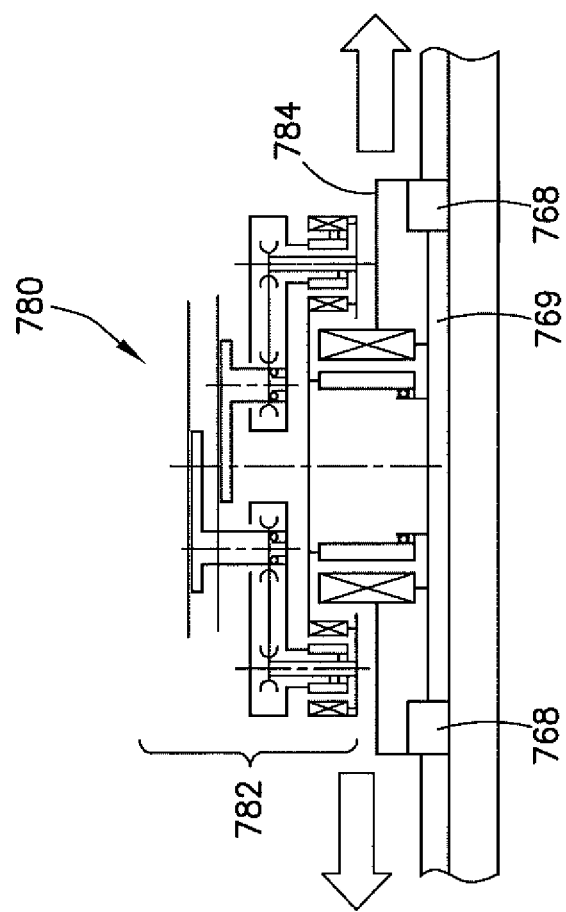
FIG.7F(1)

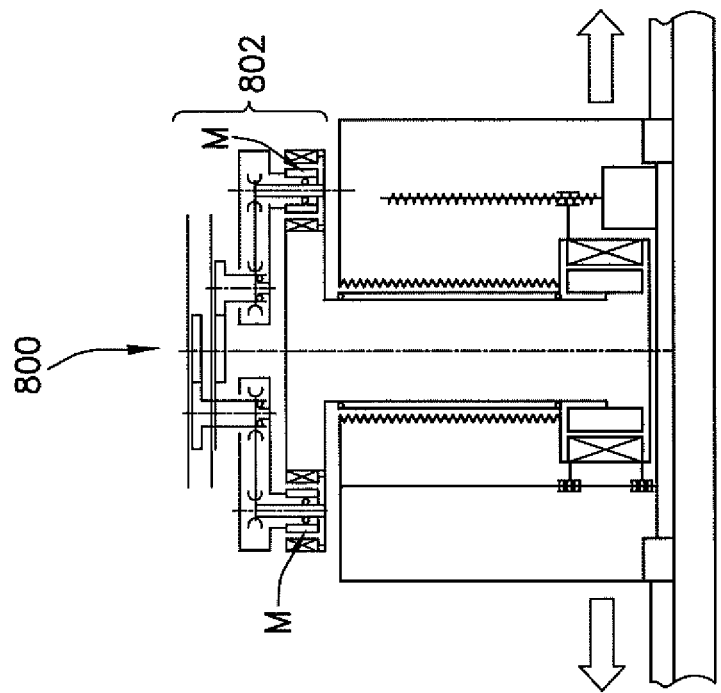
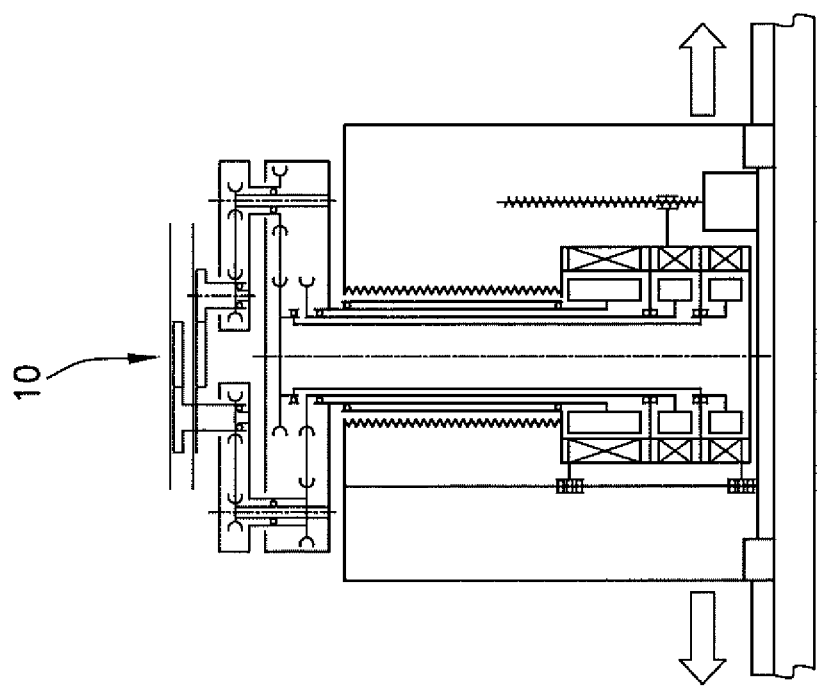
FIG.7G(1)  FIG.7G(2)

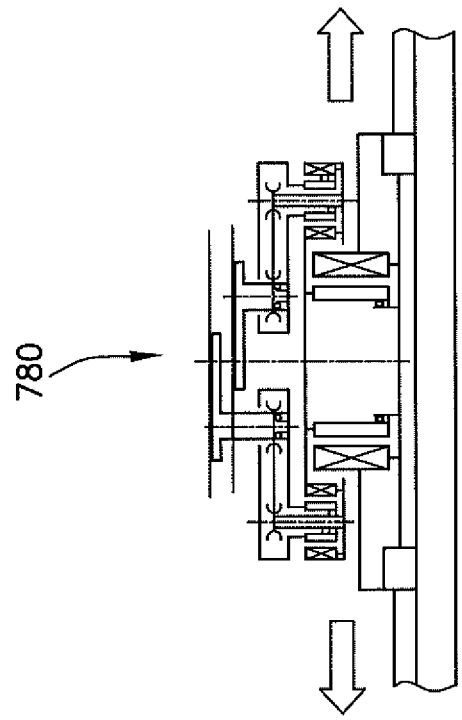
FIG.7G(4)
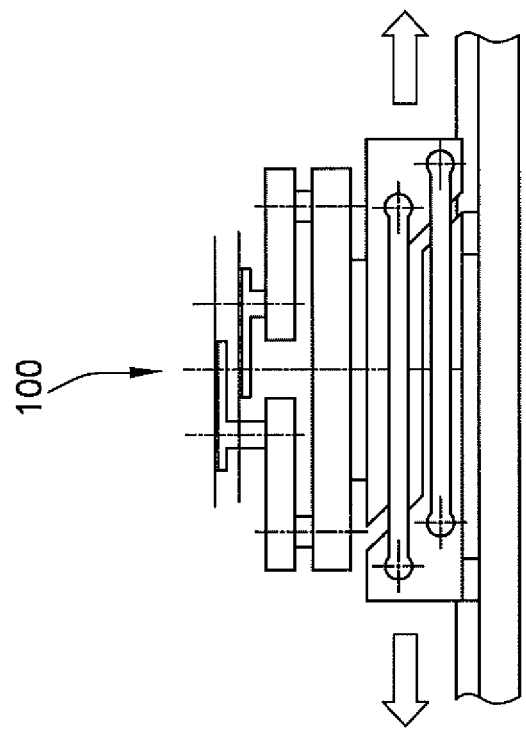
FIG.7G(3)

COMPACT TRAVERSING ROBOT

CROSS REFERENCE TO RELATED APPLICATION

This application claims priority under 35 USC 119 (e) to U.S. Provisional Application No. 62/983,846, filed Mar. 2, 2020, the content of which is hereby incorporated by reference in its entirety.

BACKGROUND

Technical Field

The example and non-limiting embodiments described herein relate generally to a vertically compact traversing robot that can be utilized in material-handling vacuum-environment systems and other applications.

Brief Description of the Prior Developments

A material-handling robot includes a robot arm coupled to a drive unit, the robot being translatable along a track or rail system. The robot arm may include an upper link, a lower link on the upper link, and an end-effector on the lower link, the end-effector being configured to accommodate a payload in a material-handling operation. The drive unit includes a spindle assembly coupled to the robot arm, a Z-axis mechanism for moving the spindle assembly up and down in a Z direction (vertically), and one or more coaxially stacked motors. The robot arm is locatable and operable in a vacuum environment, and the drive unit is locatable in an atmospheric environment. A bellows may be used to contain the vacuum environment in the space where the robot arm operates. The spindle assembly, the Z-axis mechanism for the vertical movement of the spindle assembly, and/or the coaxially stacking of the motors generally requires a substantial depth and volume of the vacuum chamber where the robot operates.

SUMMARY

In accordance with one aspect, an apparatus comprises a spindle platform; a traversing platform configured to move in a first direction; a lift system connected to the spindle platform and the traversing platform, the lift system being configured to move the spindle platform in a second direction between a collapsed position and an extended position, the second direction being perpendicular to the first direction; at least one movable arm connected to the spindle platform, the at least one movable arm comprising a first link connected to the spindle platform, a second link connected to the first link, and a third link connected to the second link, and at least one first actuator connected to the spindle platform and being configured to cause a rotation of the first link, and at least one second actuator in the at least one movable arm and being configured to cause a rotation of the second link. The first actuator extends from the spindle platform into the first link to occupy a combined thickness of the spindle platform and the first link.

In accordance with another aspect, a method comprises providing a traversing platform configured to move in a first direction; providing a spindle platform; providing a lift system connected to the spindle platform and the traversing platform, the lift system being configured to move the spindle platform in a second direction between a collapsed position and an extended position, the second direction being perpendicular to the first direction; and providing at least one movable arm connected to the spindle platform, the at least one movable arm comprising a first link connected to the spindle platform, a second link connected to the first link, and a third link connected to the second link; providing at least one first actuator connected to the spindle platform and being configured to cause a rotation of the first link, and providing at least one second actuator in the at least one movable arm and being configured to cause a rotation of the second link. The first actuator extends from the spindle platform into the first link to occupy a combined thickness of the spindle platform and the first link.

In accordance with another aspect, an apparatus comprises at least one processor; and at least one non-transitory memory including computer program code, the at least one memory and the computer program code configured to, with the at least one processor, cause the apparatus at least to perform: moving a traversing platform in a first direction; operating a lift system connected to the traversing platform and to a spindle platform to move the spindle platform in a second direction between a collapsed position and an extended position, the second direction being perpendicular to the first direction; operating at least one movable arm connected to the spindle platform, the at least one movable arm comprising a first link connected to the spindle platform, a second link connected to the first link, and a third link connected to the second link; and operating at least one first actuator means connected to the spindle platform and being configured to cause a rotation of the first link, and at least one second actuator means in the at least one movable arm and being configured to cause a rotation of the second link. The first actuator means extends from the spindle platform into the first link to occupy a combined thickness of the spindle platform and the first link.

In accordance with another aspect, an apparatus comprises a traversing platform configured to move in a first direction; a spindle platform having a first actuator and a first control connected to the first actuator; at least one movable arm connected to the spindle platform, the at least one movable arm comprising a first link connected to the first actuator and at least one second link connected to the first link, the second link comprising at least one second actuator and controlled by a second control on the at least one movable arm, the at least one first actuator being configured to cause a rotation of the first link and the at least one second actuator being configured to cause a rotation of the second link; a lift system connected to the spindle platform and the traversing platform, the lift system being configured to move the spindle platform in a second direction between a collapsed position and an extended position, the second direction being perpendicular to the first direction, the lift system having a third actuator on the traversing platform and a third control connected to the third actuator. The first actuator extends from the spindle platform into the first link to occupy a combined thickness of the spindle platform and the first link.

BRIEF DESCRIPTION OF THE DRAWINGS

The foregoing aspects and other features are explained in the following description, taken in connection with the accompanying drawings, wherein:

FIG. 1A is a schematic representation of a traversing robot having a controller;

FIGS. 1B(1)-1B(3) are schematic representations of various views of the robot of FIG. 1A;

FIGS. 1C(1) and 1C(2) are schematic representations showing internal components of the robot of FIG. 1A;

FIGS. 2A-2D are schematic representations of a traversing robot showing locations of controllers relative to motors of a traversing robot;

FIGS. 4A(1)-4A(3) and 4B(1)-4B(3) are schematic representations of a robot in various positions with respect to a spindle platform and arms of the robot;

FIGS. 7D(1) and 7D(2) are schematic representations of an example robot in which the spindle platform is supported by linear bearings and is actuated by a ball-screw drive;

FIG. 7E is a schematic representation of an example robot in which an actuating motor is located in an arm of the robot;

FIGS. 7F(1) and 7F(2) are schematic representations of an example robot having no lift mechanism;

FIGS. 7G(1)-7G(4) are schematic representations of example robots illustrating comparisons of structures.

DETAILED DESCRIPTION OF EMBODIMENT

Figure 2A:
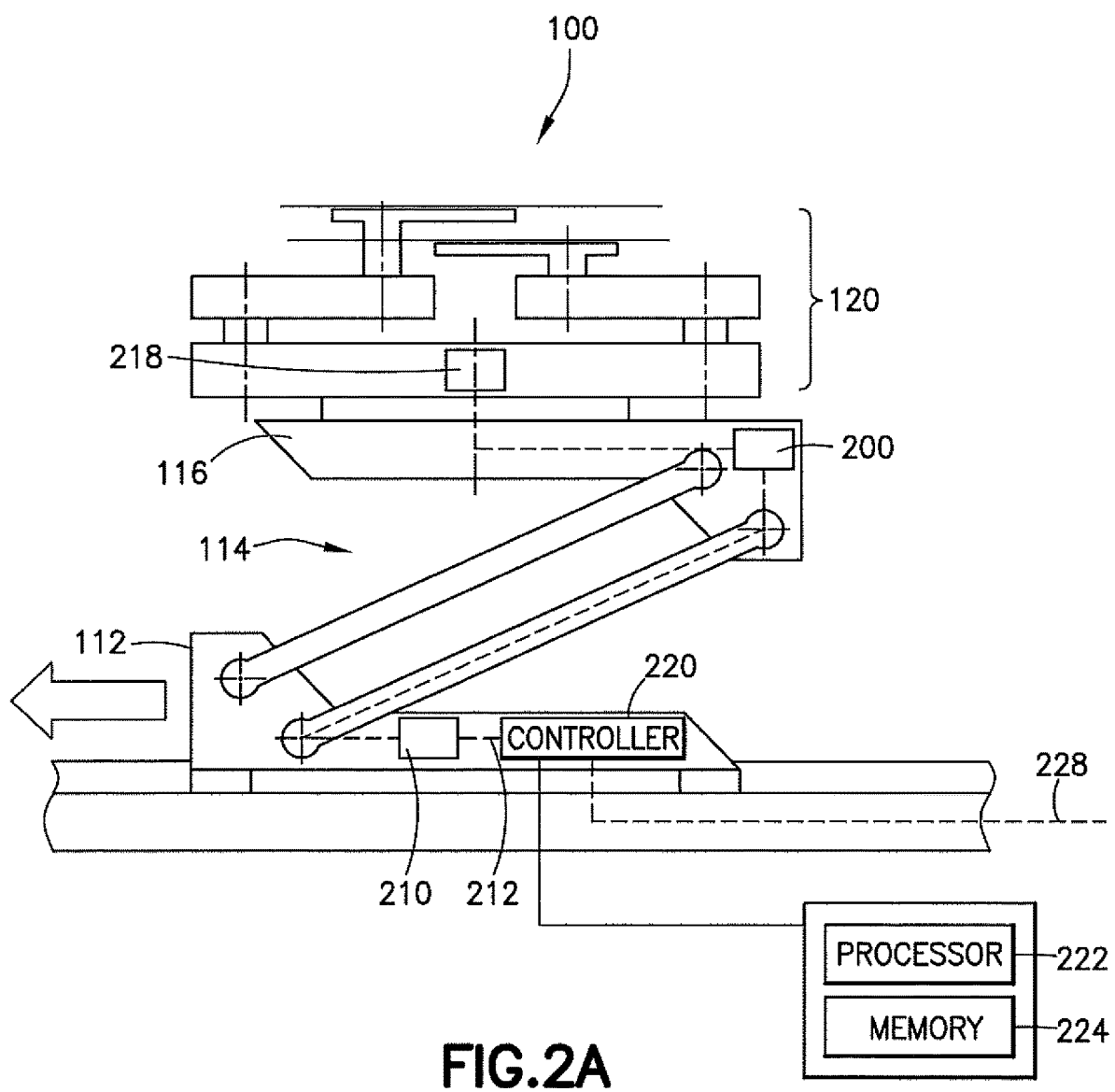

Although the features will be described with reference to the example embodiments shown in the drawings, it should be understood that features can be embodied in many alternate forms of embodiments. In addition, any suitable size, shape, or type of elements or materials could be used.

Figure 9A:
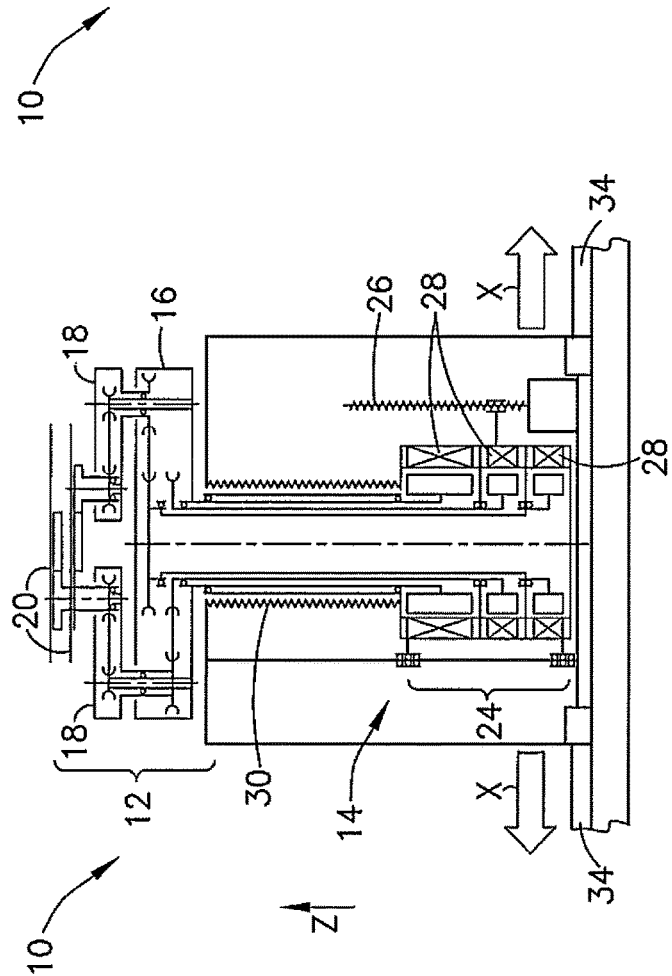
FIGS. 9A-9C are schematic representations of various views of a state-of-the art vacuum-environment material-handling traversing robot.
Figure 9B:
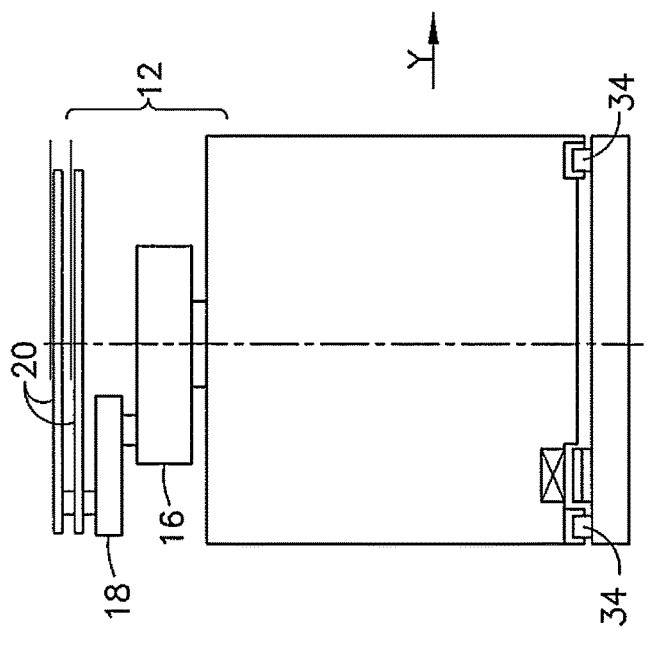
Figure 9C:
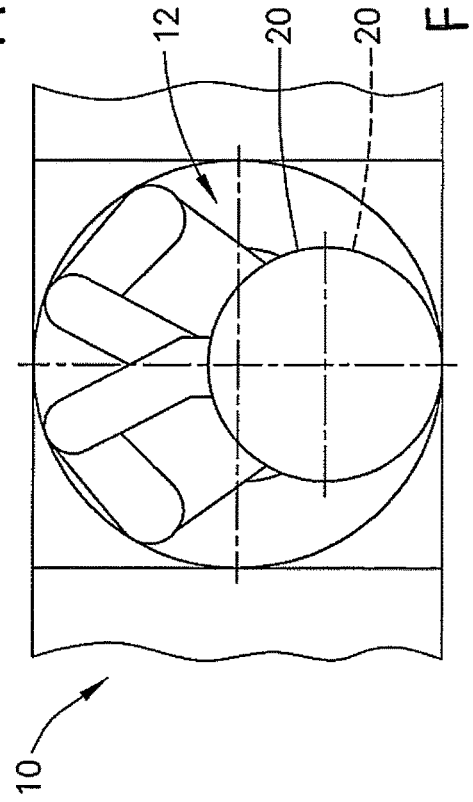

Referring to FIGS. 9A-9C, one example of a state-of-the-art vacuum-environment material-handling traversing robot is shown generally at 10 and is hereinafter referred to as "robot 10." Robot 10 comprises a robot arm 12 coupled to a drive unit 14, the robot arm 12 being locatable and operable in a vacuum environment and the drive unit 14 being locatable in an atmospheric environment. As shown, the robot arm 12 comprises an upper link 16, two lower links 18, and two end-effectors 20, one on each of the lower links 18. The drive unit 14 comprises a spindle assembly 24 coupled to the robot arm 12, a Z-axis mechanism 26 (such as a ball screw) for moving the spindle assembly 24 up and down thereby providing vertical actuation of the robot arm 12 in the Z direction, and one or more coaxially stacked motors 28. A bellows 30 may be used to contain the vacuum environment in the space where the robot arm 12 operates. The robot 10 may translate along a track 34 or rails in the X direction (shown at arrows X in FIG. 9A). The robot 10 may translate along two tracks 34 or rails, as shown in FIG. 9B. In a retracted position, the top end-effector 20 may occlude the lower end-effector 20, as shown in FIG. 9C.

One objective of the present invention is to reduce the vertical space occupied by a robot and, consequently, reduce the depth and volume of the vacuum chamber where the robot operates.

An example embodiment of a traversing robot according to the present invention is depicted diagrammatically in FIGS. 1A-1C(2) and is hereinafter referred to as "robot 100." FIG. 1A is a side view of the robot 100 with a control system 106. Additional views of the robot 100 are provided in FIGS. 1B(1)-1B(3), and an example arrangement of the internal components of the robot 100 is depicted diagrammatically in FIGS. 1C(1) and 1C(2).

As shown in FIG. 1A, the robot 100 may be supported by a stationary base 108 and may comprise a linear guidance and actuation system 110, a traversing platform 112, a lift mechanism 114, a spindle platform 116, a robot arm 120, and the control system 106.

The stationary base 108 may be a structure configured to support the robot 100. As an example, the stationary base 108 may be a plate or a frame extended along the direction of traversing motion (for example, in the X direction along an x-axis) of the robot 100, a floor or a wall of a vacuum chamber, or any other suitable structure capable of supporting the robot 100.

The linear guidance and actuation system 110 may comprise a linear guidance arrangement and a linear actuation arrangement configured to facilitate traversing motion of the traversing platform 112 with respect to the stationary base 108 (for example, in the direction along the X-axis in FIG. 1A).

As indicated diagrammatically in the example of FIG. 1A, the linear guidance arrangement may be formed by a linear bearing arrangement. As an example, the linear bearing arrangement may include one or more linear bearing rails 124 attached to the stationary base 108 and one or more linear bearing blocks 126 attached to the traversing platform 112. The linear guidance portion of the linear guidance and actuation system 110 may include a shield system configured to prevent contact with the linear bearing rails 124, prevent debris from contaminating the linear bearing blocks 126 (or other linear bearing(s)), and prevent particles from migrating out of the linear bearing blocks 126 (or other linear bearing(s)).

Alternatively, the linear guidance arrangement may be a system of wheels and rails, a cable or belt suspension system, a magnetic support system, or any other suitable arrangement configured to constrain the motion of the traversing platform 112 with respect to the stationary base 108.

As shown diagrammatically in the example of FIGS. 1C(1) and 1C(2), the linear actuation arrangement may comprise one or more linear actuators and one or more position sensors 111. Although the position sensor 111 is shown as being on the traversing platform 112, it should be understood that the position sensor 111 may be anywhere on or in the linear guidance and actuation system 110. The linear actuator of the linear actuation arrangement may comprise a stationary portion, which may be attached to the stationary base 108, and a movable portion, which may be attached to the traversing platform 112. For example, the linear actuator may be a linear motor 130, such as a permanent magnet motor. The movable portion may comprise a forcer with coils 132 (for example, a moving coil arrangement) on a bottom surface of the traversing platform 112, and the stationary portion may be formed by a magnet track 134 on the stationary base 108. In a moving magnet arrangement, the movable portion may comprise a magnet plate on the traversing platform 112, and the stationary portion may be formed by a track formed of coils 132 on the stationary base 108.

Alternatively, the linear actuation arrangement may be based on a belt drive, band drive, cable drive, ball-screw, leadscrew, or any other suitable arrangement capable of producing a force between the stationary base 108 and the traversing platform 112 substantially in the direction of the desired traversing motion of the robot 100.

The position sensor 111 of the linear actuation arrangement may be configured to measure the position of the traversing platform 112 along the desired direction of traversing motion (direction along the X-axis). As an example, the position sensor 111 may be a position encoder, such as an optical, magnetic, inductive or capacitive position encoder, a laser interferometer, or any other suitable device capable of measuring directly or indirectly (for example, in the case of a belt drive, band drive, cable drive, ball-screw, or leadscrew) the position of the traversing platform 112 along the desired direction of traversing motion.

The measurements from the position sensor 111 may be utilized by the control system 106 to control the linear actuator (for example, the linear motor 130) in order to achieve the desired motion or stationary position of the traversing platform 112 with respect to the stationary base 108 along the direction of the desired traversing motion of the robot 100 (direction along the X-axis).

The lift mechanism 114 may comprise one or more lift linkages 136 configured to move the spindle platform 116 relative to the traversing platform 112 in the vertical direction (or, more accurately, in a manner that includes a vertical motion component) and to stabilize the angular orientation of the spindle platform 116 with respect to the traversing platform 112 (for example, to keep the spindle platform 116 substantially leveled). For example, in accordance with FIGS. 1A, 1B(1), and 1C(1), the assembled lift linkages 136 may comprise a parallelogram arrangement actuated by a lift mechanism motor 140, which may be a rotary drive. The rotary drive (or other lift mechanism motor 140) may include a rotary motor and a rotary sensor. Control of movement of the spindle platform 116 (for example, to keep the spindle platform 116 substantially leveled) may be carried out using the control system 106.

In general, each of the one or more lift linkages 136 of the lift mechanism 114 may comprise one or more links, joints (of a rotary type or another suitable type), and/or pulley arrangements utilizing belts, bands, or cables. The one or more lift linkages 136 may be actuated by one or more rotary motors, linear motors, struts, or by any other suitable actuation means.

As depicted in the example of FIGS. 1A, 1B(1), 1B(2), and 1C(1), the one or more lift linkages 136 of the lift mechanism 114 may be arranged on one or both sides of the traversing platform 112. FIG. 1B(2) shows lift linkages 136 on both sides of the traversing platform 112. As another example, the one or more lift linkages 136 may be arranged on one or both faces of the traversing platform 112. Alternatively, the one or more lift linkages 136 may be arranged in any suitable location on the traversing platform 112.

The spindle platform 116 may carry the robot arm 120 and one or more motors configured to drive or actuate the robot arm 120 or a portion of the robot arm 120. As an example, as depicted diagrammatically in FIG. 1C(1), a first link 142 (upper arm) of the robot arm 120 may be coupled to the spindle platform 116 via a rotary joint, a stator 144 of a motor (motor T) may be attached to the spindle platform 116, and a rotor 146 of the motor (motor T) may be attached to the first link 142 of the robot arm 120. The motor (motor T) may conveniently protrude to and/or extend into the first link 142 of the robot arm 120 and utilize the combined thickness (height) of the spindle platform 116 and the first link 142 of the robot arm 120. Alternatively, the stator 144 of the motor (motor T) may be attached to the first link 142 of the robot arm 120, and the rotor 146 of the motor (motor T) may be attached to the spindle platform 116. While motor T is shown in an internal-rotor configuration in FIG. 1C(1), motor T may be of an external-rotor configuration or of any suitable type.

Referring to the example of FIG. 1B(1), the robot arm 120 may comprise the first link 142 (upper arm), two forearms (forearm A 150 and forearm B 152), and two wrist links (wrist link A 154 and wrist link B 156), each carrying one or more end-effectors 160, each of which may be configured to accept a payload. Each of the forearms 150, 152 may be coupled to the first link 142 via a rotary joint (elbow joint A 164 and elbow joint B 166). Two motors (motor A and motor B shown in FIG. 1C(1)) may be attached to the first link 142, each coupled to one of the two forearms 150, 152. Each of the wrist links 154, 156 may be coupled to one of the forearms 150, 152 via a rotary joint (wrist joint A 170 and wrist joint B 172). The robot arm 120 may further include two belt drives, band drives (band drives A and B are shown in the forearms 150, 152, respectively, in FIG. 1C(1)), or cable drives, each configured to constrain the angular orientation of one of the wrist links 154, 156. The belt drives, band drives, or cable drives may employ circular and/or non-circular pulleys, as described in U.S. Pat. Nos. 9,149,936, 9,840,004, 9,889,557, and 10,224,232, which are hereby incorporated by reference in their entireties.

The traversing platform 112, spindle platform 116, and robot arm 120 may include features configured to remove heat produced by the motors and other active components attached to them. As an example, the robot arm 120 and the spindle platform 116 may include surface(s) (flat, cylindrical, or of any suitable shape) that may face each other and allow heat to be transferred from the robot arm 120 to the spindle platform 116 via radiation and, if residual gases are present, conduction and convection mechanisms. Similarly, the traversing platform 112 and spindle platform 116 may feature surfaces configured to extract heat out from the robot arm 120 using radiation and, if residual gases are present, heat conduction and convection.

The control system 106 of the robot 100 may receive external inputs, for example, from the user or a host system, read positions of individual motion axes (motors) from position encoders (not shown for simplicity), and process the information to apply voltages to the motors to perform the desired motion and/or achieve the desired position.

Figure 2B:
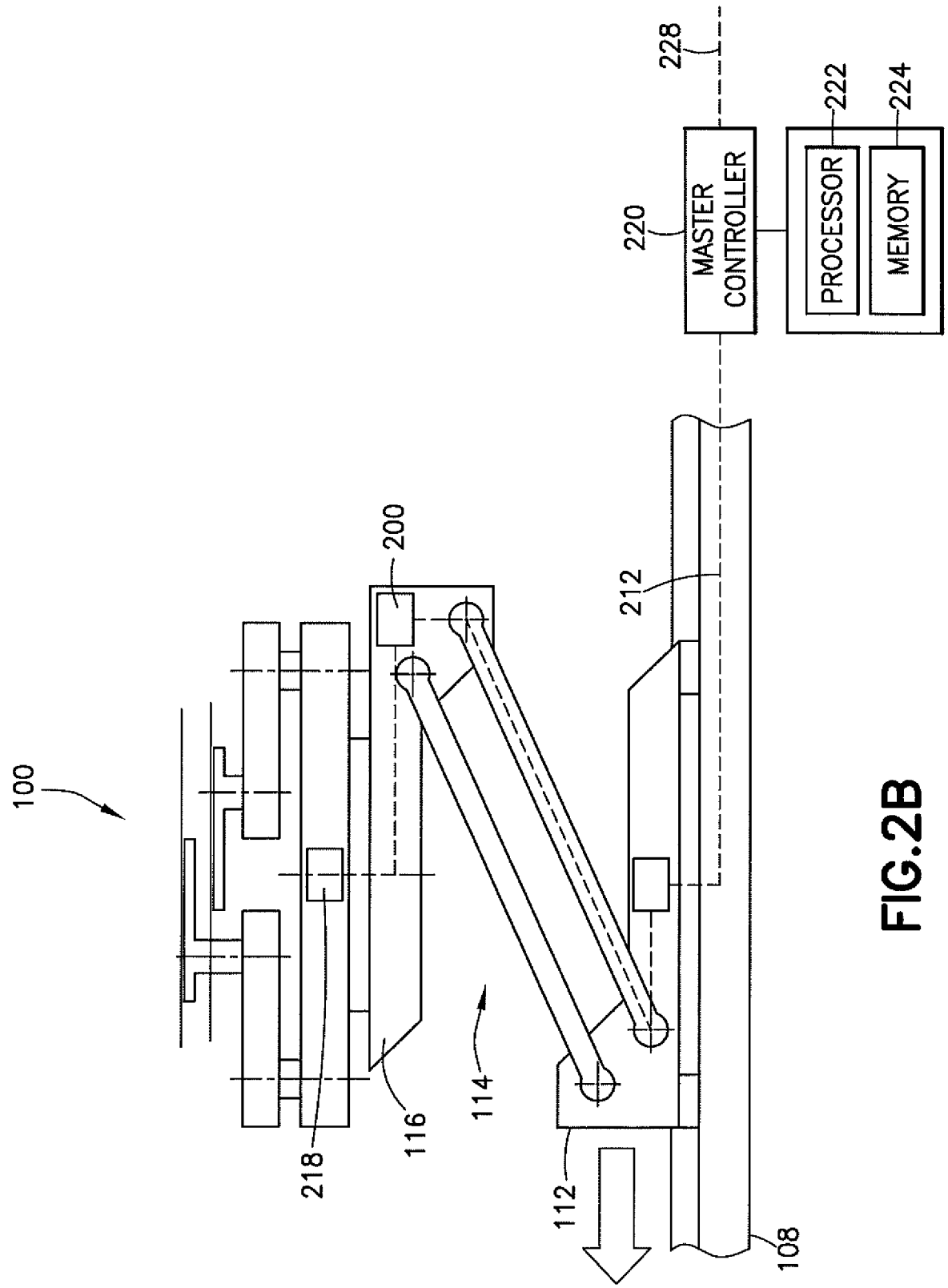

In one example embodiment, as illustrated diagrammatically, for example, in FIG. 2A, the actuators (motors) in the robot 100 may be controlled by control module(s) located conveniently in close proximity to the respective actuators. The actuator(s) (for example, motor T) located on the spindle platform 116 may be controlled by a controller or control system or control module(s) 200 attached to or located in the spindle platform 116. The actuator(s) (for example, the lift mechanism motor 140) of the lift mechanism 114 may be controlled by a controller or control module(s) 210 located on or in the traversing platform 112. The actuator(s) in the robot arm 120 may be controlled by a controller or control module(s) 218 in the robot arm 120. The control modules 200, 210, 218 may be coordinated, for instance, over a communication network 212, by a master controller 220 which may be also located in the traversing platform 112 and in communication with a host communication system 228. The master controller 220 and the control module 210 of the lift mechanism 114 may be separate devices or they may be combined into a single integrated device. Alternatively, as depicted diagrammatically in FIG. 2B, the master controller 220 may reside outside of the traversing platform 112, stationary with respect to the stationary base 108. In any configuration, the master controller 220 may comprise one or more processors 222 and one or more memories 224 with code configured to perform operations as described herein.

Figure 2C:
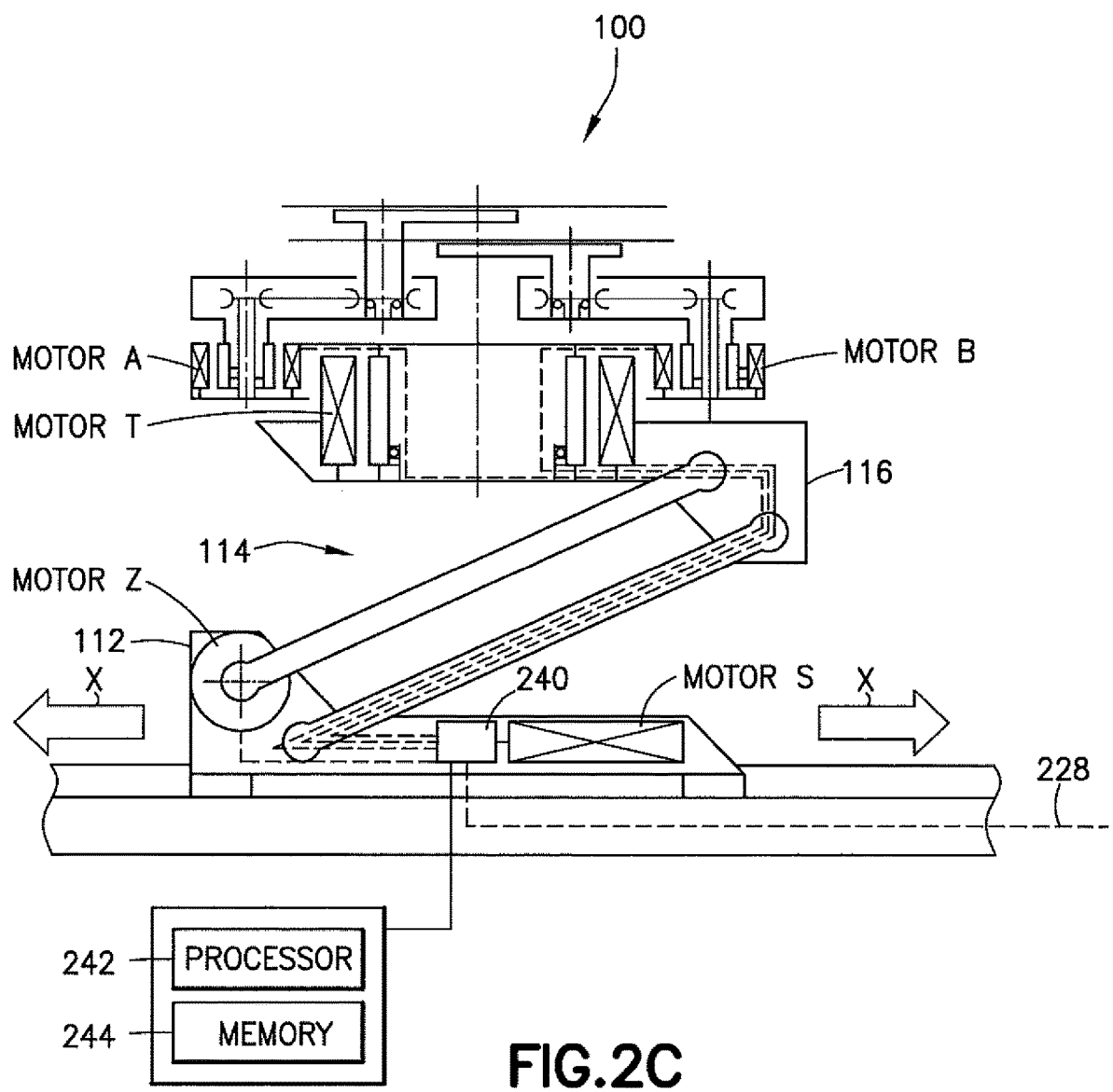

In another example embodiment, encoder signals 238 and motor lines may be brought to a centralized controller 240 located in the traversing platform 112 or outside of the traversing platform 112 (stationary with respect to the stationary base 108), as shown diagrammatically in FIGS. 2C and 2D. Alternatively, any combination of the configurations of FIGS. 2A to 2D may be used. The centralized controller 240 may comprise one or more processors 242 and one or more memories 244 with code configured to perform operations as described herein.

In the examples of FIGS. 2C and 2D, motor S refers to the actuator of the linear actuation arrangement, and motor 2 refers to the actuator of the lift mechanism 114. The control modules are indicated at 200, 210, and 218.

The lift mechanism 114 and the robot arm 120 may include arrangements to deliver electrical power, transmit electrical signals, and circulate fluid (gas and/or liquid) within the robot 100. These arrangements may be needed for the control system (power delivery and electrical signal transmission) and to enhance heat removal (fluid circulation). An example arrangement that may facilitate power delivery, signal transmission, and/or fluid circulation between components coupled by a rotary joint is depicted diagrammatically in FIG. 3A at 300 and is referred to as "arrangement 300."

Figure 3A:
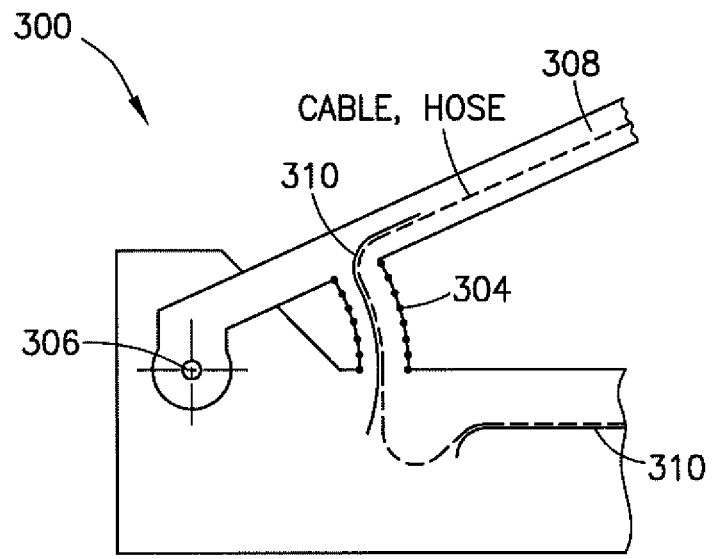
FIGS. 3A and 3B are schematic representations of connections of internal volumes of components in a robot.

As shown in FIG. 3A, a bellows 304 may be utilized to connect internal volumes of components coupled by a rotary joint 306 to provide a passage 308 for one or more cables and/or one or more hoses. Shaped guides 310 may be used to constrain the one or more cables and/or one or more hoses and prevent the one or more cables and/or one or more hoses from rubbing against the bellows 304 and other components.

Figure 3B:
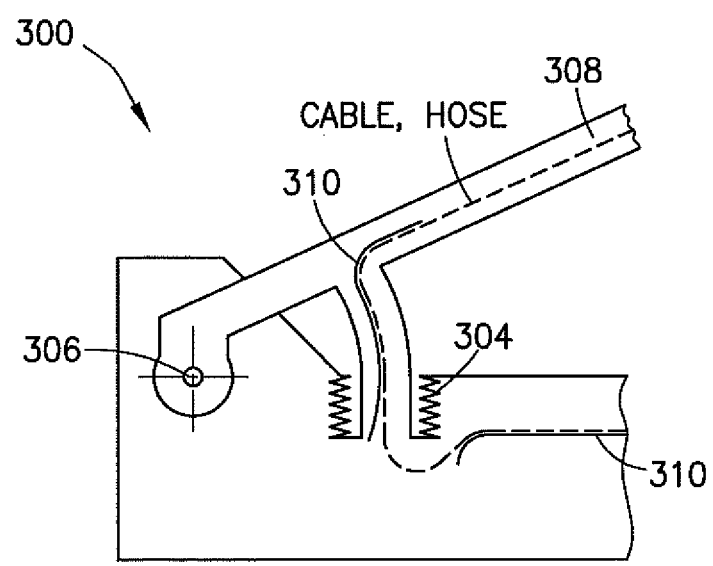

In the example arrangement 300 of FIG. 3A, the internal volume of the bellows 304 may be at substantially the same pressure as the internal volumes of the robot components that it connects, which may be higher than the pressure of the external vacuum environment. Alternatively, for added stability of the bellows 304, the arrangement can be reconfigured so that the lower pressure environment is inside of the bellows 304, as shown diagrammatically in FIG. 3B. In FIG. 3B, the bellows 304 is shown in its compressed position.

Other example arrangements that may facilitate power delivery, signal transmission, and/or fluid circulation through a rotary joint can be found in U.S. Pat. No. 10,569,430, which is hereby incorporated by reference in its entirety.

Additional arrangements may be used to transmit electrical power and communication signals between the stationary base and the traversing platform 112 of the robot 100. For example, a service loop, an inductive coupling, a capacitive coupling, an optical communication link, or a radiofrequency communication system may be employed for this purpose.

The robot 100 may traverse along the stationary base 108, elevate the spindle platform 116, rotate the robot arm 120, and extend each of the end-effectors of the robot arm 120, as illustrated diagrammatically in FIGS. 4A(1)-4A(3) and 4B(1)-4B(3). As an example, FIGS. 4A(1)-4A(3) depict the robot 100 in one position with respect to the stationary base 108 with the spindle platform 116 lowered and both end-effectors 160 retracted. As another example, FIGS. 4B(1)-4B(3) depict the robot 100 in another position with respect to the stationary base 108 with the spindle platform 116 elevated and one end-effector 160 extended.

Figure 5B:
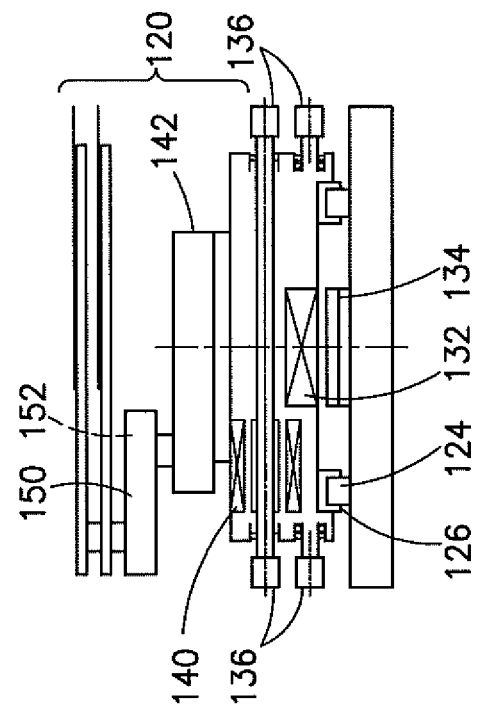
FIGS. 5A and 5B are schematic representations of a robot showing overlap of components when the spindle platform is lowered.
Figure 5A:
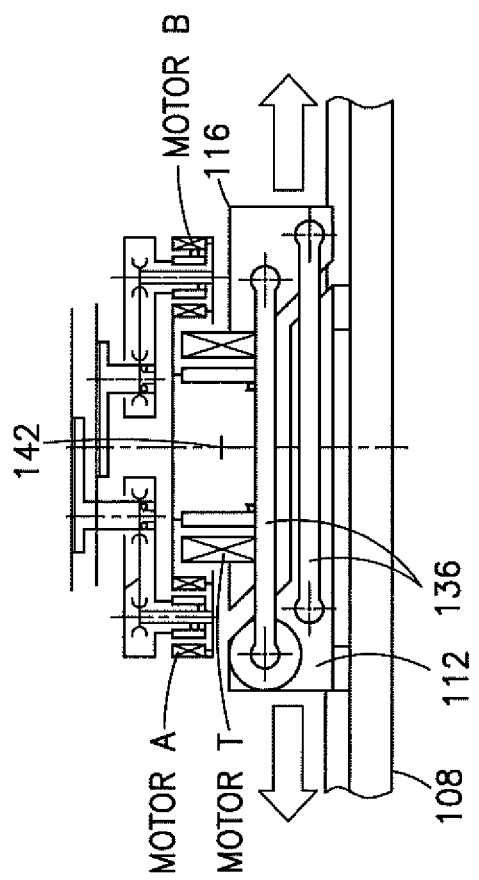

A distinctive feature of the example embodiment of FIG. 1A is that the motors and other components of the robot 100 may nest or overlap vertically, (share substantially the same vertical space (in particular when the spindle platform 116 is lowered and is in a collapsed position, as illustrated in FIGS. 5A and 5B)). As shown in FIG. 5A, portions of the motor T may protrude into the first link 142 of the robot arm 120 even when the spindle platform 116 is collapsed relative to the traversing platform 112 or when the robot arm 120 is retracted. This reduces the vertical space occupied by the robot 100 and, consequently, the depth and volume of the vacuum chamber where the robot 100 may operate. At least motor A or motor B may also nest with motor T in the collapsed position to further reduce the vertical space occupied by the robot 100.

Figure 6:
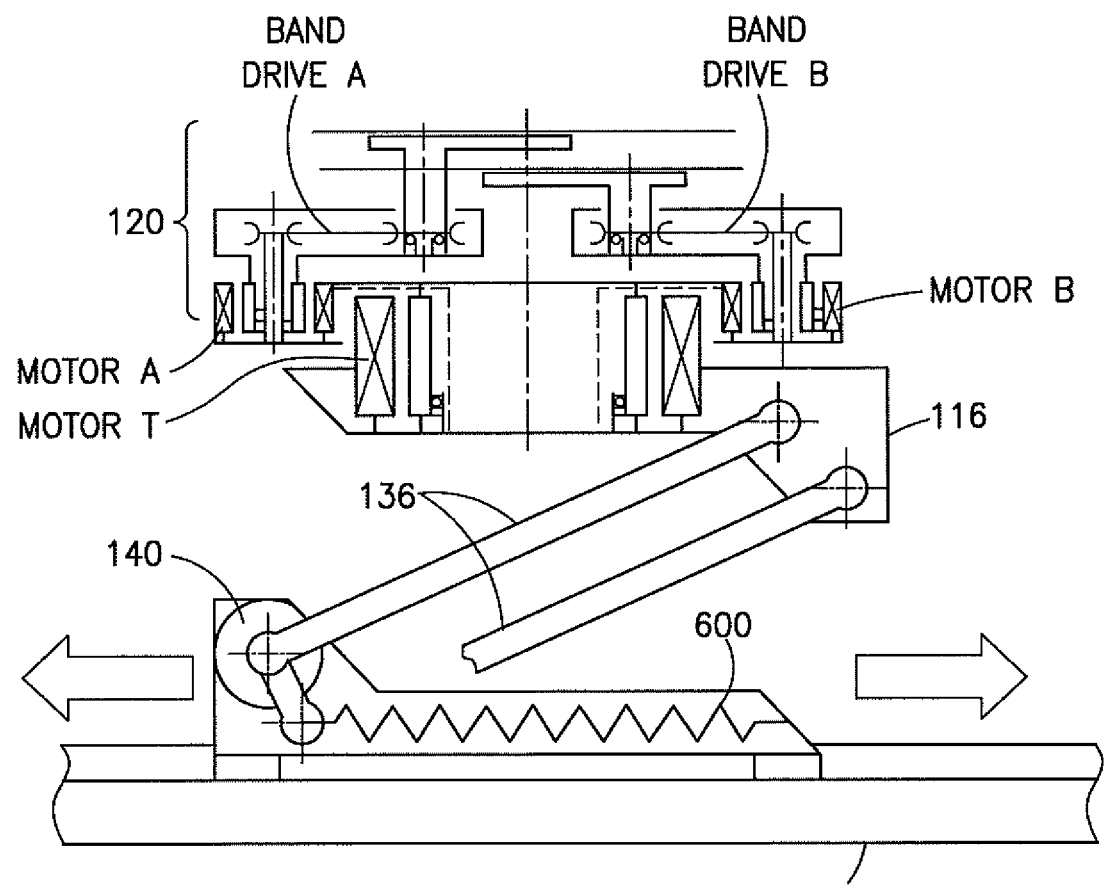
FIG. 6 is a schematic representation of an alternative example embodiment of a robot having a counterbalancing feature.
Figure 7A:
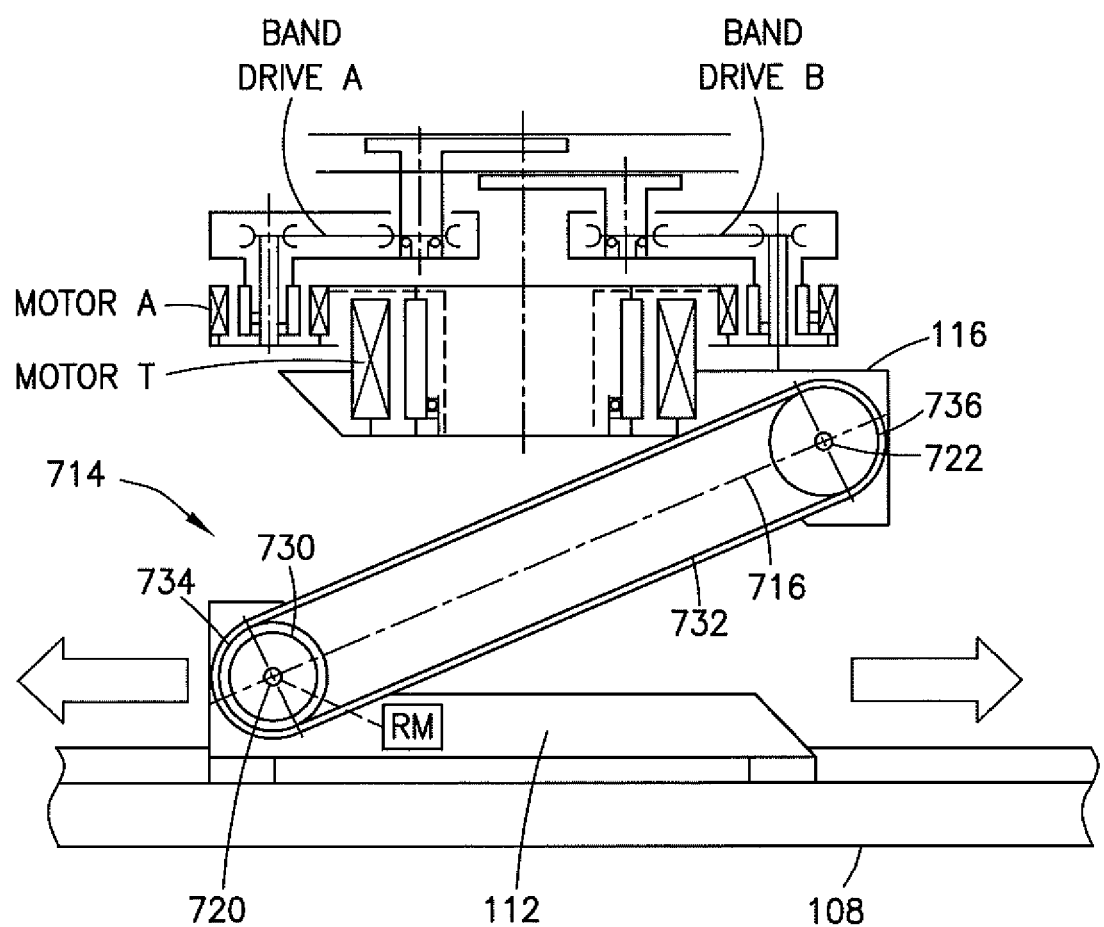
FIGS. 7A-7C are schematic representations of alternative example embodiments of lift mechanisms for robots.
Figure 7B:
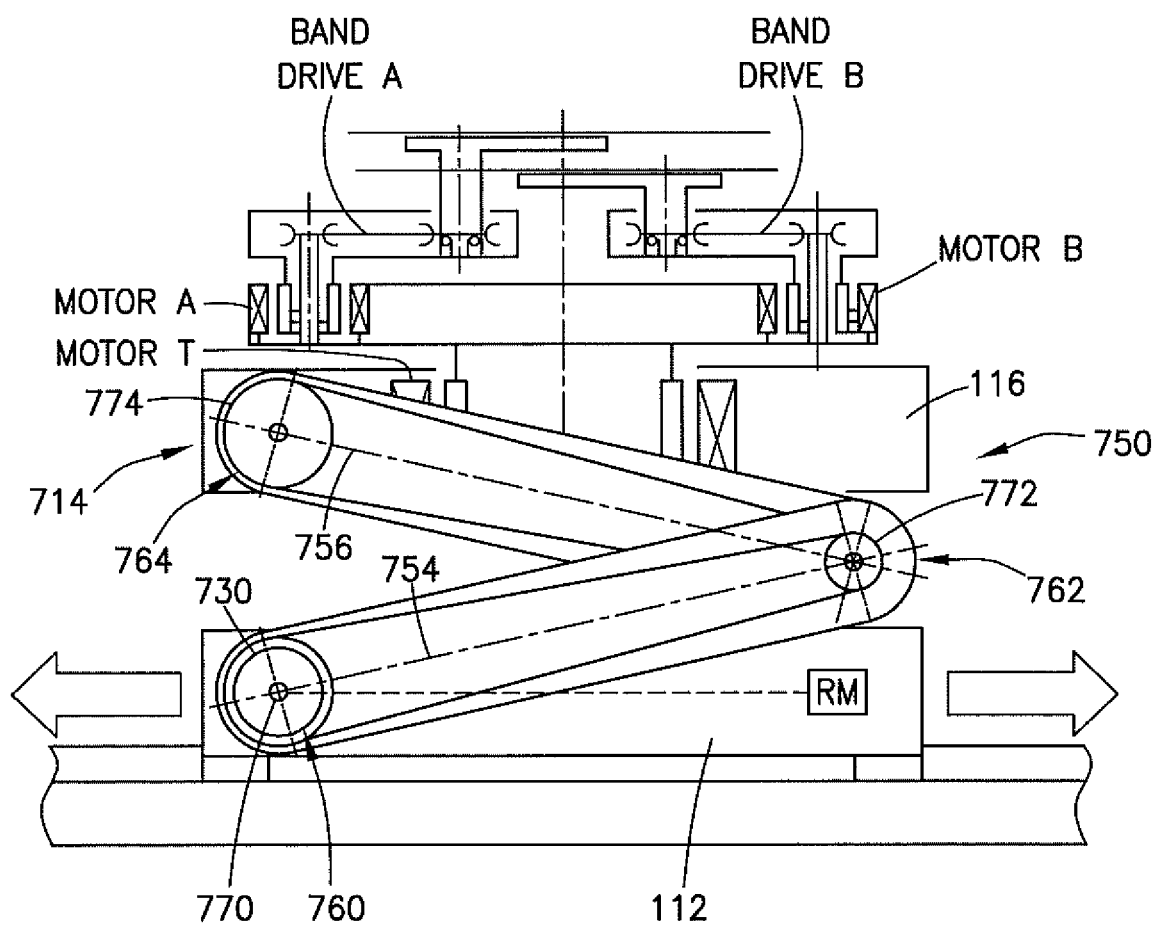
Figure 7C:
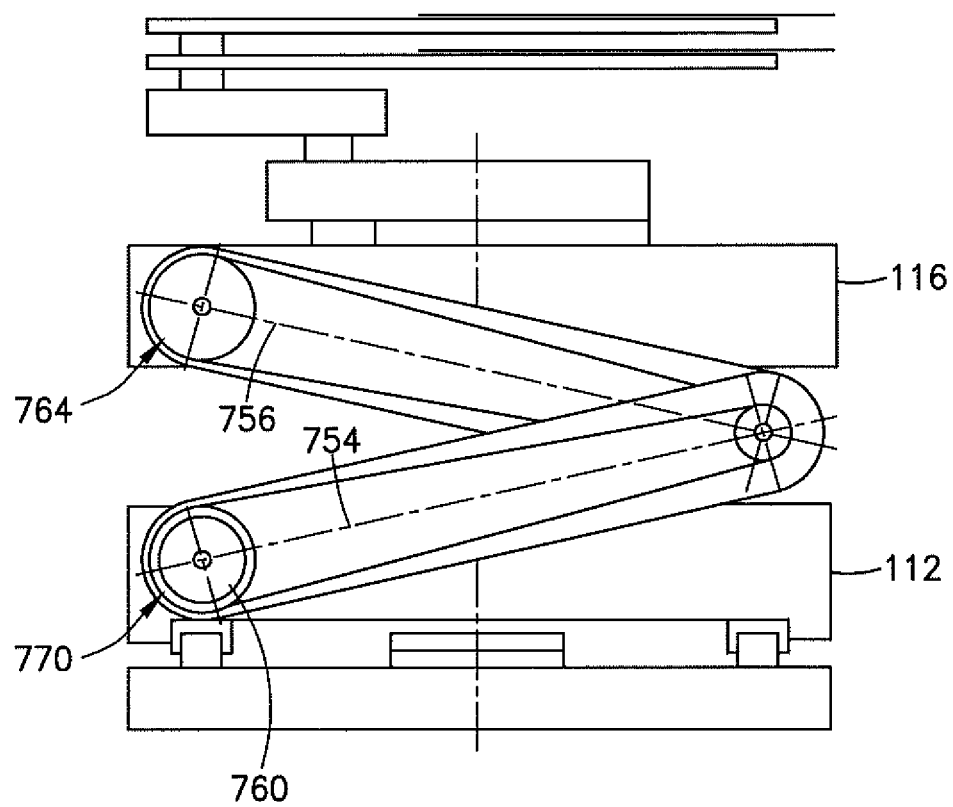
Figure 8:
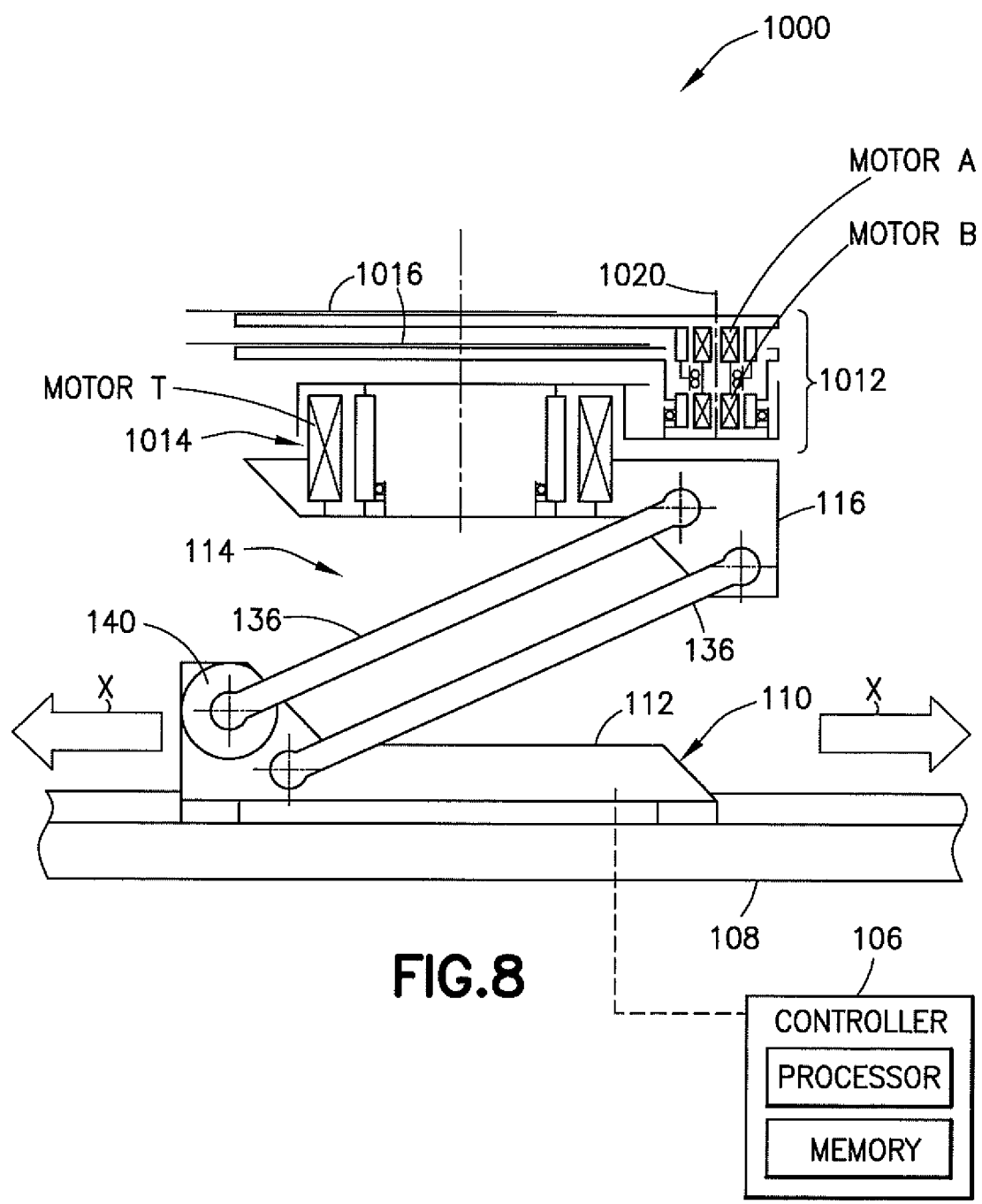
FIG. 8 is a schematic representation of a robot arm having an upper arm and two forearms.

Alternative example embodiments of the traversing robot 100 according to the present invention are depicted diagrammatically in FIGS. 6-8.

The lift mechanism may 114 include a counterbalancing feature, such as a counterweight or a spring (for example, a coil spring or a torsion spring) to reduce the torque or force on the actuator (motor) of the lift mechanism 114. An example embodiment with a counterbalancing feature that utilizes a coil spring 600 in tension is depicted diagrammatically in FIG. 6. Alternatively, any other suitable counterbalancing feature may be used.

An example alternative lift mechanism is diagrammatically depicted in FIG. 7A and is hereinafter referred to as "lift mechanism 714." The lift mechanism 714 may include a link 716, which may be coupled to the traversing platform 112 and the spindle platform 116 by rotary joints 720 and 722, respectively. The lift mechanism 714 may further include an actuator or motor 730 configured to drive a band 732 (or a belt or cable), the driving of which is configured to maintain the same angular orientation of the spindle platform 116 with respect to the traversing platform 112, for example, to keep the spindle platform 116 substantially leveled. In this arrangement, as shown, a first pulley 734 may be attached to the traversing platform 112 and a second pulley 736 may be attached to the spindle platform 116.

As indicated in FIG. 7A, the link 716 may be actuated by a rotary motor RM attached to the traversing platform 112. When the rotary motor RM actuates the link 716 to rotate with respect to the traversing platform 112, the spindle platform 116 changes elevation with respect to the traversing platform 112. Alternatively, the rotary motor RM may be attached to the spindle platform 116. As another alternative, a linear motor, strut, or any other suitable actuation means may be used to actuate the link 716 of the lift mechanism 714.

Another example alternative lift mechanism is diagrammatically shown in FIG. 7B at 750. The lift mechanism 750 may include a linkage which may comprise a first link 754 and a second link 756. The first link 754 may be coupled to the traversing platform 112 by a first rotary joint 760, the second link 756 may be coupled to the first link 754 by a second rotary joint 762, and the spindle platform 116 may be coupled to the second link 756 by yet a third rotary joint 764. The linkage of the lift mechanism 750 may further include two belt drives, band drives, or cable drives configured to maintain the same angular orientation of the spindle platform 116 with respect to the traversing platform 112, for example, to keep the spindle platform 116 substantially leveled.

As shown in FIG. 7B, the first belt drive, band drive, or cable drive may be located inside of the first link 754, connecting a first pulley 770 attached to the traversing platform 112 and a second pulley 772 attached to the second link 756. The diameter of the first pulley 770 attached to the traversing platform 112 may be twice the diameter of the second pulley 772 attached to the second link 756. The second belt drive, band drive, or cable drive may be located inside of the second link 756, connecting the second pulley 772 to a third pulley 774 on the spindle platform 116. The diameter of the third pulley 774 may be about twice the diameter of the second pulley 772 and the same or similar to the diameter of the first pully 770.

Referring still to FIG. 7B, the first link 754 of the linkage of the lift mechanism 750 may be actuated by a rotary motor RM in or on the traversing platform 112. In this arrangement, when the rotary motor RM actuates the first link 754 so that the first link 754 rotates with respect to the traversing platform 112, the spindle platform 116 vertically moves with respect to the traversing platform 112. Alternatively, a linear motor, strut, or any other suitable actuation means may be used to actuate the lift mechanism 750.

Although the example lift mechanism 750 of FIG. 7B is shown with two links of the same joint-to-joint length and with circular pulleys, the two links may be of unequal joint-to-joint lengths and some or all of the pulleys may be non-circular. Alternatively, any suitable number of links and pulley types may be used. Linkages defined by the first link 754 and the second link 756 may be arranged on one or both sides of the traversing platform 112 and connected to one or both sides of the spindle platform 116.

As another example, as shown diagrammatically in FIG. 7C, the linkage(s) defined by the first link 754 and the second link 756 of the lift mechanism 750 may be arranged on one or both faces of the traversing platform 112 and connected to one or both faces of the spindle platform 116 (as opposed to the sides of the spindle platform 116). Alternatively, the first link 754 and the second link 756 of the lift mechanism 750 may be arranged in any suitable location between the traversing platform 112 and the spindle platform 116.

Referring now to FIGS. 7D(1) and 7D(2), a simplified cross-sectional view of an example embodiment robot 700 having a robot arm 702 is shown. The example robot 700 may utilize one or more linear bearings and a linear actuation system. In the example robot 700, a spindle platform 766 may be supported by one or more linear bearings 768 and a linear actuator (such as a forcer/coil arrangement on a rail or track system such as rails 769, as in previous examples). The spindle platform 766 may be actuated up and down, for example, by a suitable Z-axis mechanism 26 (for example, a ball-screw drive, a leadscrew, band drive, belt drive, cable drive, linear motor, or any other suitable means of actuation). As shown, a bellows 776 may be utilized to contain the vacuum environment while allowing the spindle platform 766 to move up and down. The height of the robot 700 can be reduced as compared to other examples disclosed herein by relocating the motor M that actuates the upper arm 778 to the robot arm 702, as illustrated diagrammatically in FIG. 7E.

An example embodiment of a traversing robot according to the present invention with no lift mechanism is depicted diagrammatically in FIGS. 7F(1) and 7F(2) and is hereinafter referred to as "robot 780." Robot 780 comprises a robot arm 782 mounted directly on a base 784, which utilizes one or more linear bearings 768 configured to slide along rails 769 (or tracks). Robot 780 also includes a linear actuation system as in previous example embodiments.

A comparison of selected example embodiments with a robot reflecting the state of the art is provided in FIGS. 7G(1), 7G(2), 7G(3), and 7G(4). FIG. 7G(1) shows a simplified cross-sectional view of the robot 10 reflecting the state of the art; FIG. 7G(2) depicts an example embodiment of a traversing robot 800 with two motors M relocated to a robot arm 802; FIG. 7G(3) illustrates another example embodiment with a linkage-based lift mechanism, for example, robot 100; and FIG. 7G(4) shows an example embodiment with no lift mechanism, for example, robot 780.

Although a single spindle platform supported by a single lift mechanism is shown as part of the above example embodiments, any number of spindle platforms and lift mechanisms, including no lift mechanism, may be used.

An example alternative robot is diagrammatically depicted in FIG. 8 at 1000 and is hereinafter referred to as "robot 1000." The robot 1000 may be supported by a stationary base 108 and may comprise a linear guidance and actuation system 110, a traversing platform 112, a lift mechanism 114, a spindle platform 116, and the control system 106 as in previous examples. An arm 1012 is mounted on the spindle platform 116, the arm 1012 having an upper arm 1014 and two forearms 1016, each carrying an end-effector, the forearms 1016 being coupled to the upper arm 1014 via a coaxial rotary joint (referred to as the elbow joint 1020). The upper arm 1014 may house two motors (motor A and motor B), each configured to actuate one of the two forearms 1016. Although FIG. 8 shows motors A and B in a configuration with external rotors, motors A and B may be of an internal-rotor configuration. Alternatively, any suitable motor configuration, type, and design may be used.

It should be noted that the bearings, bearing arrangements, and bearing locations shown in the diagrams described herein are intended for illustration only—the purpose is to communicate how individual components may generally be constrained with respect to each other. Any suitable bearings, bearing arrangements, and bearing locations may be used.

Although a communication network is described as the means of communication between the various components of the control system, any other suitable means of communication between the master controller and the control modules, such as a wireless network or a point-to-point bus, may be utilized.

Features as described herein may be used with features as described in pending U.S. patent application Ser. Nos. 16/788,993, 16/788,973, and 15/294,099 which are hereby incorporated by reference in their entireties.

In one example embodiment, an apparatus comprises a spindle platform; a traversing platform configured to move in a first direction; a lift system connected to the spindle platform and the traversing platform, the lift system being configured to move the spindle platform in a second direction between a collapsed position and an extended position, the second direction being perpendicular to the first direction; at least one movable arm connected to the spindle platform, the at least one movable arm comprising a first link connected to the spindle platform, a second link connected to the first link, and a third link connected to the second link, and at least one first actuator connected to the spindle platform and being configured to cause a rotation of the first link, and at least one second actuator in the at least one movable arm and being configured to cause a rotation of the second link. The first actuator extends from the spindle platform into the first link to occupy a combined thickness of the spindle platform and the first link.

The at least one first actuator and the at least one second actuator may be configured to overlap in a vertical direction. The first actuator may be configured to nest with the second actuator. The apparatus may further comprise a linear guidance system on the traversing platform, the linear guidance system being configured to constrain a motion of the traversing platform in a linear direction. The linear guidance system may comprise at least one linear bearing on the traversing platform, the at least one linear bearing being configured to engage and slide on a rail. The apparatus may further comprise a linear actuation system on the traversing platform, the linear actuation system being configured to move the traversing platform in a linear direction. The linear actuation system may comprise a linear actuator and at least one position sensor. The linear actuator may comprise a permanent magnet motor having at least one coil, the at least one coil being configured to magnetically engage a track. The at least one position sensor may be located on the traversing platform and may be configured to be controlled along the linear direction using a control. The lift system may comprise at least one linkage extending between and rotatable relative to the traversing platform and the spindle platform. The at least one linkage may be rotatable on the traversing platform using a rotary actuator. The rotary actuator may be controllable using a control to maintain the spindle platform in a substantially leveled position relative to the traversing platform. The lift system may further comprise a counterbalancing spring.

In another example embodiment, a method comprises providing a traversing platform configured to move in a first direction; providing a spindle platform; providing a lift system connected to the spindle platform and the traversing platform, the lift system being configured to move the spindle platform in a second direction between a collapsed position and an extended position, the second direction being perpendicular to the first direction; and providing at least one movable arm connected to the spindle platform, the at least one movable arm comprising a first link connected to the spindle platform, a second link connected to the first link, and a third link connected to the second link; providing at least one first actuator connected to the spindle platform and being configured to cause a rotation of the first link, and providing at least one second actuator in the at least one movable arm and being configured to cause a rotation of the second link. The first actuator extends from the spindle platform into the first link to occupy a combined thickness of the spindle platform and the first link.

The at least one first actuator and the at least one second actuator may be configured to overlap in a vertical direction. The method may further comprise providing a linear guidance system on the traversing platform, the linear guidance system being configured to constrain a motion of the traversing platform in a linear direction. The method may further comprise providing a linear actuation system on the traversing platform, the linear actuation system being configured to move the traversing platform in a linear direction. The method may further comprise using a position sensor and a control to control a movement of the traversing platform in the first direction. The method may further comprise using a control to control a movement of the spindle platform in the second direction.

In another example embodiment, an apparatus comprises at least one processor; and at least one non-transitory memory including computer program code, the at least one memory and the computer program code configured to, with the at least one processor, cause the apparatus at least to perform: moving a traversing platform in a first direction; operating a lift system connected to the traversing platform and to a spindle platform to move the spindle platform in a second direction between a collapsed position and an extended position, the second direction being perpendicular to the first direction; operating at least one movable arm connected to the spindle platform, the at least one movable arm comprising a first link connected to the spindle platform, a second link connected to the first link, and a third link connected to the second link; and operating at least one first actuator means connected to the spindle platform and being configured to cause a rotation of the first link, and at least one second actuator means in the at least one movable arm and being configured to cause a rotation of the second link. The first actuator means extends from the spindle platform into the first link to occupy a combined thickness of the spindle platform and the first link.

The apparatus may be further caused to nest the first actuator means with the second actuator means. Moving the traversing platform in the first direction may comprise using a linear drive system to move the traversing platform along a rail. Using a linear drive system to move the traversing platform along the rail y comprise operating a permanent magnet motor having a coil arrangement along a magnet track. The apparatus may further comprise using the at least one processor and the at least one non-transitory memory with a position sensor on the traversing platform to sense a position of the traversing platform. The apparatus may further comprise using the at least one processor and the at least one non-transitory memory with the lift system to level the spindle platform relative to the traversing platform.

In another example embodiment, an apparatus comprises a traversing platform configured to move in a first direction; a spindle platform having a first actuator and a first control connected to the first actuator; at least one movable arm connected to the spindle platform, the at least one movable arm comprising a first link connected to the first actuator and at least one second link connected to the first link, the second link comprising at least one second actuator and controlled by a second control on the at least one movable arm, the at least one first actuator being configured to cause a rotation of the first link and the at least one second actuator being configured to cause a rotation of the second link; a lift system connected to the spindle platform and the traversing platform, the lift system being configured to move the spindle platform in a second direction between a collapsed position and an extended position, the second direction being perpendicular to the first direction, the lift system having a third actuator on the traversing platform and a third control connected to the third actuator. The first actuator extends from the spindle platform into the first link to occupy a combined thickness of the spindle platform and the first link.

The first actuator may nest with the at least one second actuator. The first control, the second control, and the third control may be coordinated over a communication network by a master control. The master control may be located on the traversing platform. The master control may be located external to the traversing platform. The traversing platform may be configured to move in the first direction along a system of linear bearings and rails. The apparatus may further comprise a system of magnets and coils configured to move the traversing platform in the first direction.

It should be understood that the foregoing description is only illustrative. Various alternatives and modifications can be devised by those skilled in the art. For example, features from different embodiments described above could be selectively combined into a new embodiment. Accordingly, the description is intended to embrace all such alternatives, modifications, and variances which fall within the scope of the appended claims.

What is claimed is:

1. An apparatus, comprising:
a spindle platform;
a traversing platform configured to move in a first direction;
a lift system connected to the spindle platform and the traversing platform, the lift system being configured to move the spindle platform in a second direction between a collapsed position and an extended position, the second direction being perpendicular to the first direction;
at least one movable arm connected to the spindle platform, the at least one movable arm comprising a first link connected to the spindle platform, a second link connected to the first link, and a third link connected to the second link,
at least one first actuator connected to the spindle platform and being configured to cause a rotation of the first link, and at least one second actuator in the at least one movable arm and being configured to cause a rotation of the second link; and
a master control located on the traversing platform, the master control coordinating a first control of the at least one first actuator, a second control of the at least one second actuator, and a third control of the lift system;
wherein the at least one first actuator extends from the spindle platform into the first link to occupy a combined thickness of the spindle platform and the first link; and
wherein the at least one first actuator is configured to nest with the at least one second actuator.

2. The apparatus of claim 1, wherein the at least one first actuator and the at least one second actuator are configured to overlap in a vertical direction.

3. The apparatus of claim 1, further comprising a linear guidance system on the traversing platform, the linear guidance system being configured to constrain a motion of the traversing platform in a linear direction.

4. The apparatus of claim 3, wherein the linear guidance system comprises at least one linear bearing on the traversing platform, the at least one linear bearing being configured to engage and slide on a rail.

5. The apparatus of claim 1, further comprising a linear actuation system on the traversing platform, the linear actuation system being configured to move the traversing platform in a linear direction.

6. The apparatus of claim 5, wherein the linear actuation system comprises a linear actuator and at least one position sensor.

7. The apparatus of claim 6, wherein the linear actuator comprises a permanent magnet motor having at least one coil, the at least one coil being configured to magnetically engage a track.

8. The apparatus of claim 6, wherein the at least one position sensor is located on the traversing platform and is configured to be controlled along the linear direction using a control.

9. The apparatus of claim 1, wherein the lift system comprises at least one linkage extending between and rotatable relative to the traversing platform and the spindle platform.

10. The apparatus of claim 9, wherein the at least one linkage is rotatable on the traversing platform using a rotary actuator.

11. The apparatus of claim 10, wherein the rotary actuator is controllable using a control to maintain the spindle platform in a substantially leveled position relative to the traversing platform.

12. The apparatus of claim 1, wherein the lift system further comprises a counterbalancing spring.

13. A method, comprising:
providing a traversing platform configured to move in a first direction;
providing a spindle platform;
providing a lift system connected to the spindle platform and the traversing platform, the lift system being configured to move the spindle platform in a second direction between a collapsed position and an extended position, the second direction being perpendicular to the first direction; and
providing at least one movable arm connected to the spindle platform, the at least one movable arm comprising a first link connected to the spindle platform, a second link connected to the first link, and a third link connected to the second link;
providing at least one first actuator connected to the spindle platform and being configured to cause a rotation of the first link, and providing at least one second actuator in the at least one movable arm and being configured to cause a rotation of the second link; and
providing a master control on the traversing platform, the master control coordinating a first control of the at least one first actuator, a second control of the at least one second actuator, and a third control of the spindle platform;
wherein the first actuator extends from the spindle platform into the first link to occupy a combined thickness of the spindle platform and the first link; and
wherein the at least one first actuator and the at least one second actuator are configured to overlap in a vertical direction.

14. The method of claim 13, further comprising providing a linear guidance system on the traversing platform, the linear guidance system being configured to constrain a motion of the traversing platform in a linear direction.

15. The method of claim 13, further comprising providing a linear actuation system on the traversing platform, the linear actuation system being configured to move the traversing platform in a linear direction.

16. The method of claim 13, further comprising using a position sensor and a control to control a movement of the traversing platform in the first direction.

17. The method of claim 13, further comprising using the third control to control a movement of the spindle platform in the second direction.

18. An apparatus, comprising:
at least one processor; and
at least one non-transitory memory including computer program code, the at least one memory and the computer program code configured to, with the at least one processor, cause the apparatus at least to perform:
moving a traversing platform in a first direction;
operating a lift system connected to the traversing platform and to a spindle platform to move the spindle platform in a second direction between a collapsed position and an extended position, the second direction being perpendicular to the first direction;

operating at least one movable arm connected to the spindle platform, the at least one movable arm comprising a first link connected to the spindle platform, a second link connected to the first link, and a third link connected to the second link;

operating at least one first actuator means connected to the spindle platform and being configured to cause a rotation of the first link, and at least one second actuator means in the at least one movable arm and being configured to cause a rotation of the second link; and operating a master control on the traversing platform, the master control coordinating a first control of the at least one first actuator means, a second control of the at least one second actuator means, and a third control of the movement of the spindle platform in the second direction;

wherein the first actuator means extends from the spindle platform into the first link to occupy a combined thickness of the spindle platform and the first link; and wherein the first actuator means is nested with the second actuator means.

19. The apparatus of claim 18, wherein moving the traversing platform in the first direction comprises using a linear drive system to move the traversing platform along a rail.

20. The apparatus of claim 19, wherein using a linear drive system to move the traversing platform along the rail comprises operating a permanent magnet motor having a coil arrangement along a magnet track.

21. The apparatus of claim 18, further comprising using the at least one processor and the at least one non-transitory memory with a position sensor on the traversing platform to sense a position of the traversing platform.

22. The apparatus of claim 18, further comprising using the at least one processor and the at least one non-transitory memory with the lift system to level the spindle platform relative to the traversing platform.

23. An apparatus, comprising:

a traversing platform configured to move in a first direction;

a spindle platform having a first actuator and a first control connected to the first actuator;

at least one movable arm connected to the spindle platform, the at least one movable arm comprising a first link connected to the first actuator and at least one second link connected to the first link, the second link comprising at least one second actuator and controlled by a second control on the at least one movable arm, the at least one first actuator being configured to cause a rotation of the first link and the at least one second actuator being configured to cause a rotation of the second link; and a lift system connected to the spindle platform and the traversing platform, the lift system being configured to move the spindle platform in a second direction between a collapsed position and an extended position, the second direction being perpendicular to the first direction, the lift system having a third actuator on the traversing platform and a third control connected to the third actuator;

wherein the first actuator extends from the spindle platform into the first link to occupy a combined thickness of the spindle platform and the first link;

wherein the first control, the second control, and the third control are coordinated over a communication network by a master control; and wherein the master control is located on the traversing platform.

24. The apparatus of claim 23, wherein the first actuator nests with the at least one second actuator.

25. The apparatus of claim 23, wherein the master control is located external to the traversing platform.

26. The apparatus of claim 23, wherein the traversing platform is configured to move in the first direction along a system of linear bearings and rails.

27. The apparatus of claim 26, further comprising a system of magnets and coils configured to move the traversing platform in the first direction.

* * * * *